US007406632B2

United States Patent
Sealey et al.

(10) Patent No.: US 7,406,632 B2
(45) Date of Patent: Jul. 29, 2008

(54) ERROR REPORTING NETWORK IN MULTIPROCESSOR COMPUTER

(75) Inventors: Charles Sealey, Beaverton, OR (US); John Lynch, Portland, OR (US); Mark Myers, Portland, OR (US); Jason Lewis, Keizer, OR (US); Stacey Lloyd, Hillsboro, OR (US); Paul Kayfes, Beaverton, OR (US)

(73) Assignee: Fujitsu Siemens Computers, LLC, Milpitas, CA (US)

( * ) Notice: Subject to any disclaimer, the term of this patent is extended or adjusted under 35 U.S.C. 154(b) by 1122 days.

(21) Appl. No.: 10/607,517

(22) Filed: Jun. 26, 2003
(Under 37 CFR 1.47)

(65) Prior Publication Data
US 2004/0205420 A1 Oct. 14, 2004

(30) Foreign Application Priority Data
Jun. 26, 2002 (EP) .................................. 02014000

(51) Int. Cl.
*G06F 11/00* (2006.01)

(52) U.S. Cl. .......................................... 714/48; 714/47
(58) Field of Classification Search .................. 714/47, 714/48
See application file for complete search history.

(56) References Cited

U.S. PATENT DOCUMENTS
5,410,542 A * 4/1995 Gerbehy et al. ............. 370/364
(Continued)

FOREIGN PATENT DOCUMENTS
JP 54071954 6/1979
(Continued)

OTHER PUBLICATIONS
Author not listed: "Mechanism for Capturing Failure Data with a Replaceable Machine Element", IBM Technical Disclosure Bulletin, IBM Corp., vol. 37, No. 01, Jan. 1994, pp. 163-164.
(Continued)

*Primary Examiner*—Scott T Baderman
*Assistant Examiner*—Paul F. Contino
(74) *Attorney, Agent, or Firm*—Laurence A. Greenberg; Werner H. Stemer; Ralph E. Locher

(57) ABSTRACT

A high-performance, high-reliable backplane bus has a simple configuration and operation. An error reporting network (ERN) provides an inexpensive approach to collecting the error state of a whole system in a uniform and consistent way. The uniformity allows for simpler interface software and for standardized hardware handling of classes of errors. In a preferred embodiment, serial error registers are used, minimizing implementation cost and making the software interface to the serial registers much easier. Serial error information is transferred over a separate data path from the main parallel bus, decreasing the chance of the original error corrupting the error information. Each CPU is provided with a local copy of the entire body of error information. The redundancy minimizes the impact of a possible CPU failure and allows the CPUs to coordinate error recovery.

8 Claims, 14 Drawing Sheets

U.S. PATENT DOCUMENTS

| | | | |
|---|---|---|---|
| 6,131,112 A * | 10/2000 | Lewis et al. | 709/207 |
| 2001/0008021 A1 * | 7/2001 | Ote et al. | 714/31 |
| 2002/0080930 A1 * | 6/2002 | Cho | 379/90.01 |
| 2003/0101385 A1 * | 5/2003 | Lee | 714/48 |
| 2004/0153870 A1 * | 8/2004 | Konz et al. | 714/47 |

FOREIGN PATENT DOCUMENTS

| | | |
|---|---|---|
| WO | 02/31656 A2 | 4/2002 |

OTHER PUBLICATIONS

Kieckhafer, R. et al.: "The MAFT Architecture for Distributed Fault Tolerance", I.E.E.E. Transactions on Computers, IEEE, vol. 37, No. 4, Apr. 1988, pp. 398-405.

Sachs, M. W.: "Automatic Transfer of Sense Data to Channel", IBM Technical Disclosure Bulletin, IBM Corp., vol. 25, No. 3B, Aug. 1982, pp. 1738-1739.

Johnson, D. B.: "Error Reporting in the Intel iAPX 432", IEEE Comp. Soc. Press, 1984, pp. 24-28.

* cited by examiner

ERROR REPORTING NETWORK IN MULTIPROCESSOR COMPUTER

BACKGROUND OF THE INVENTION

Field of the Invention

The present invention relates to multiprocessor computers, more particularly to an error-reporting network in a multiprocessor computer.

In computer systems, a bus is commonly used to communicate between logical blocks or modules. The modules connect to a common communications medium, such as a set of wires, or printed circuit board traces. The rules that govern the access of modules to the bus and data transfer constitute the bus protocol. Generally, all modules on a bus must use the same protocol.

In a typical bus implementation, a set of traces is embedded, in one or more printed circuit boards. Modules connect to the bus through bus transceivers. Modules connected to a bus may all reside on the same printed circuit board. Alternatively, modules may reside on separate printed circuit boards and be attached to an electromechanical structure that incorporates the physical bus medium through a series of connectors. The physical bus medium, together with the electromechanical structure that incorporates it, is called the backplane bus.

In a multiprocessing computer, multiple processors are provided, each of which performs a portion of an overall computational task. A symmetric multi-processing (SMP) computer is one in which each processor has substantially equal access to system resources in general. Typically, in an SMP computer, multiple processor boards, memory boards and VO boards plug into a common backplane bus to realize a robust, reconfigurable computer system. Processor boards may have multi-level caches, for example a primary on-chip cache, a fast secondary (e.g. SRAM) cache, and a slower tertiary (e.g. DRAM) cache. A cache coherency model is used to update data in various levels of caches among the various processor boards to ensure that out-of-date data is not used.

Various standards have been developed which define the physical features and protocols of different backplane busses, including, for example, the Pyramid C-Bus, the Intel/Siemens/BiiN AP-Bus, and the IEEE FutureBus/FutureBus+. Generally, the signal lines on standard backplane buses can be partitioned into logical groupings that include a data transfer bus, which includes address and data lines; an arbitration bus, which includes control acquisition lines; and a utility bus, which includes power leads and, on some buses, clock signals, initialization and failure detection lines.

One measure of bus performance is aggregate throughput, i.e., on average, how much data can be transferred across the bus in a given period of time. Throughput is in turn a function of raw bus speed (how fast signals can be driven) and bus utilization (how busy the bus can be kept). Another consideration in assessing bus performance is reliability and fault tolerance. Faults are inevitable in digital computer systems due, at least in part, to the complexity of the circuits and of the associated electromechanical devices, and to programming complexity. Computers and buses may be configured on the one hand to be reliable, or, on the other hand, may be configured to be fault tolerant. In a reliable computer system, faults are detected and operations suspended while the fault is diagnosed and the system is reconfigured to remove the faulty component. In a fault tolerant computer system, redundancy is configured into the system in such a manner that if a component fails, a redundant component is able to take up where the failed component left off without any perceptible delay. Fault tolerant construction greatly increases system cost and complexity.

Apart from data lines, which may be parity protected, all buses have control lines, errors on which cause unwanted behavior. Most buses are not configured for fault resilience and simply tolerate the possibility of undetected errors on a small number of signals that have no error detection. In bus based fault resilient systems, a number of different solutions to the problem of detecting control signal errors have been employed. Voting between multiple sets of lines may be used to provide both error detection and correction. A protocol may be configured that does not have any signals that cannot be parity protected. A side band signal may be used to compute line status between checking agents. Another approach involves time based check pointing in which a signature register is checked periodically to confirm consistent operation. Each of these measures is relatively complicated and costly.

Apart from error detection, error reporting in prior art multiprocessor systems also suffers from various disadvantages. Typically, when an error is detected, an error signal is generated, resulting in an interrupt to the processor. The error state is saved in parallel form in control registers. Software then reads the error information. In such an approach, the cost per error bit, in terms of the number of gates, is high. Furthermore, there is no synchronization of error information. If multiple errors occur, then there is no way of knowing which errors occurred first and which are likely side effects of the first error (error propagation). Because each board is different and each register is different, accessing the error information is performed ad hoc, resulting in a more complicated software interface. Finally, in many cases the error information has to be read over the same data paths as the source of the error, likely causing additional errors.

A less common serial approach involves, when an error is detected, generating a prioritized serial error message. The error message is saved in a register. Prioritizing, however, requires complex hardware at each sender. Furthermore, only the highest priority message is sent, and the error status information of only one board is saved in a single error buffer, and other views of errors being discarded.

Because of the limited error data, the possible error analysis is similarly limited. In some schemes, no prioritizing of messages is performed after a message has started. A low priority message in progress therefore holds off critical high priority error data.

A need therefore exists for a high-reliability SMP backplane bus that is simpler than existing buses but offers comparable or improved performance compared to the existing buses. More particularly, there exists a need for an error reporting network for a back-plane bus that requires only simple error sending and error receiving logic but that allows more error information (preferably all error information) to be read by software, enabling more complex error recovery or error localization.

SUMMARY OF THE INVENTION

It is accordingly an object of the invention to provide an error reporting network in a multiprocessor computer that overcomes the above-mentioned disadvantages of the prior art devices of this general type.

With the foregoing and other objects in view there is provided, in accordance with the invention, in a computer system having a plurality of processor boards, each of the processor boards generating a plurality of error signals in response to different conditions on the processor boards, and a parallel transaction bus connected to each of the processor boards, an error reporting network. The error reporting network contains a signal line, separate from the parallel transaction bus, and connected to each of the processor boards. Each of the processor boards contains means for generating an error detection signal, control means responsive to the error detection signal for generating in sequence a plurality of control signals, means responsive to one of the control signals for collecting and storing the plurality of error signals, means responsive to one of the control signals for generating an error notification signal and for communicating the error notification signal to each of the processor boards over the signal line, and means responsive to one of the control signals for communicating the plurality of error signals to each of the processor boards serially over the signal line.

In accordance with an added feature of the invention, each of the processor boards further contains storage means, further control means responsive to the error notification signal for generating in sequence a plurality of further control signals, means responsive to one of the further control signals for converting to parallel form and storing in the storage means as error information the plurality of error signals communicated from each of the processor boards serially over the signal line, and means connected to the storage means for reading out the error information.

In accordance with a further feature of the invention, each of the processor boards is assigned a different slot number and the signal line is time division multiplexed between all of the processor boards. The control means is responsive to the slot number for controlling the means for communicating so as to communicate the plurality of error signals serially over the signal line within a predetermined time slot in relation to other ones of the processor boards.

With the foregoing and other objects in view there is further provided, in accordance with the invention, a method of communicating an error status between processor boards of a computer system. Each of the processor boards generates a plurality of error signals in response to different conditions on the processor boards. The computer system further has a parallel transaction bus connected to each of the processor boards, and a signal line, separate from the parallel transaction bus, connected to each of the processor boards. Each of the processor boards performs the steps of: generating an error detection signal; generating in sequence a plurality of control signals; collecting and storing the plurality of error signals; generating an error notification signal and communicating the error notification signal to each of the processor boards over the signal line; and communicating the plurality of error signals to each of the processor boards serially over the signal line.

In accordance with an added mode to the invention, there are the further steps of: generating in sequence a plurality of further control signals in response to the error notification signal; converting to parallel form and storing as error information the plurality of error signals communicated from each of the processor boards serially over the signal line; and reading out the error information.

In accordance with a further mode of the invention, there are the further steps of: assigning each of the processor boards a different slot number and the signal line is time division multiplexed between all of the processor boards; and during the communicating step, communicating the plurality of error signals. serially over the signal line within a predetermined time slot in relation to other ones of the processor boards.

The present invention, generally speaking, provides a high-performance, high-reliability backplane bus that is simple in its configuration and operation as compared to prior art high-performance buses. In accordance with one embodiment of the invention, an error reporting network (ERN) provides an inexpensive approach to collecting the error state of a whole system in a uniform and consistent way. The uniformity allows for simpler interface software and for standardized hardware handling of classes of errors. In a preferred embodiment, serial error registers are used, minimizing implementation cost and making the software interface to the general registers much easier. Serial error information is transferred over a separate data path from the main parallel bus decreasing the chance of the original error corrupting the error information. Each CPU is provided with a local copy of the entire body of error information. The redundancy minimizes the impact of a possible CPU failure and allows the CPUs to coordinate error recovery.

Other features which are considered as characteristic for the invention are set forth in the appended claims.

Although the invention is illustrated and described herein as embodied in an error reporting network in a multiprocessor computer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
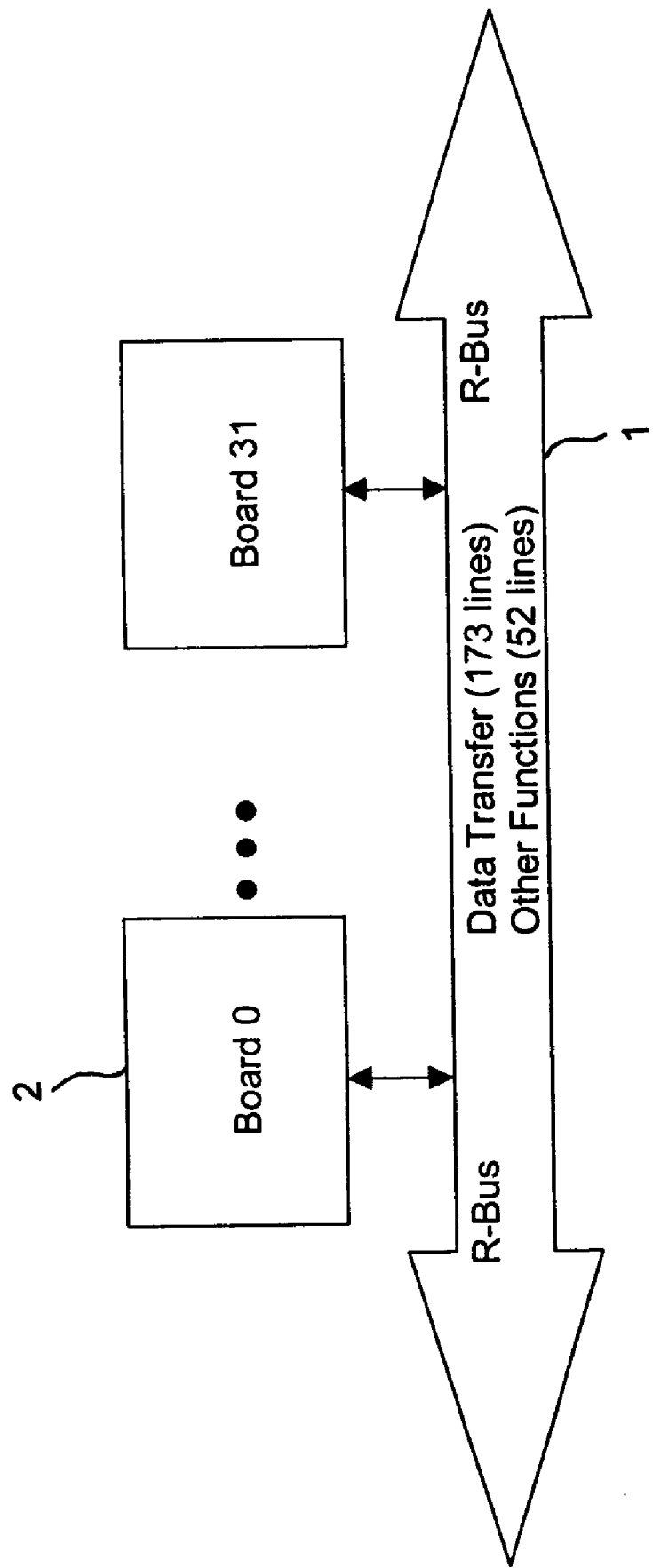
FIG. 1 is a simplified block diagram of a computer system having a backplane bus according to the invention.

Referring now to the figures of the drawing in detail and first, particularly, to FIG. 1 thereof, there is shown the logical, electrical, and connector specifications of an R-Bus 1 by Pyramid Technology Corporation. The R-Bus 1 is a proprietary backplane bus 1 used to connect boards 2 in the NILE series systems from Pyramid Technology. The R-Bus 1 is a high-performance, block-oriented system bus that supports multiprocessor cache coherency, extensive error checking, and hardware fault tolerance.

In a preferred embodiment, the R-Bus 1 that allows up to 30 boards 2 to be connected to the R-Bus 1. Each of the boards 2 is identified by its slot, from slot 1 to slot 30. Some slots may be empty and some slots may contain boards. A board 2 may contain up to four modules, designated module 0 to module 3. A particular R-Bus implementation may support fewer boards. For example, a smaller system R-Bus implementation might support 12 slots.

Processor boards, memory boards, I/O boards, and other board types may be intermixed on the R-Bus 1. In other implementations, clock boards, certain I/O boards, or boot processor boards may be restricted to certain slots. Electrically, in an exemplary embodiment, the R-Bus 1 is a synchronous bus with a clock rate of 25 MHz. The R-Bus 1 uses bus transceiver logic (BTL) transceivers for most signals. The R-Bus data transfer path is 128 bits wide. The bus bandwidth is 400 Mbytes per second peak, 267 Mbytes per second for writes, 228 Mbytes per second for reads.

Logically, the R-Bus 1 provides block transfer operations (64 bytes) and "partial" operations used to read or write 1, 4, or 8 bytes at a time. Read operations are split into separate read request and read response transactions, allowing other bus traffic to use the R-Bus 1 during an actual memory access. A typical R-Bus block transfer consists of one address/command bus cycle followed by several data cycles followed by one rest cycle. Each data cycle transfers 16 bytes. For example, a block write involves one address/command cycle followed by four data cycles, followed by one rest cycle, for a total of six cycles. Because the R-Bus 1 is block-oriented and provides a wide data path, high data transfer rates can be sustained. For example, with a 25 MHz clock and a 64-byte block size, data can be transferred at a rate of 2.13 billion bits per second, 267 million bytes per second.

Several R-Bus block transactions include cache coherency support, so that multiple processors sharing memory may keep their cache states consistent. More particularly, the R-Bus 1 provides support for maintaining cache coherency in a system with multiple processors and with a cache interposed between each processor and the R-Bus 1. Processor modules using the R-Bus 1 may use write-back or write-through caching strategies and may use any of a number of caching protocols.

The R-Bus 1 does not require the use of any particular caching protocol. However, a number of bus signaling mechanisms are defined that may be used to implement a caching protocol. In particular, a processor can intervene in a block read to supply more recent data from its cache. Blocks can be read "shared" (allowing other processors to also cache the block) or "exclusive" (not allowing other processors to cache the block). An invalidate bus transaction can be used to eliminate a block from other caches in the system, thus making the block exclusive.

The R-Bus 1 supports read-partial and write-partial transactions used to access hardware registers. These transactions can transfer 1, 2, 4, or 8 bytes. A hardware register address must be a multiple of the transfer size used to access the register.

When a module needs to send a bus transaction, it must gain and keep exclusive control of the data transfer lines of the bus for the duration of the transaction. Modules contend for, acquire, hold, and relinquish that control through a process called arbitration. As described in greater detail in copending U.S. application Ser. No. 08/328,896, Multiprocessor Computer Backplane Bus filed Oct. 25, 1994, commonly assigned and incorporated herein by reference, the R-Bus arbitration protocol uses a dedicated set of lines, is distributed (compatible arbitration logic is present on each board with no "master" of the arbitration process), and has low overhead, because arbitration may take place while a transaction is using the data transfer lines of the bus.

The R-Bus 1 provides different kinds of system service lines including clock, reset, and error reporting lines. More particularly, the R-Bus 1 provides a single bus clock. All R-Bus data transfer and arbitration lines are synchronous to the bus clock. The bus clock frequency in a preferred embodiment is 25 Mhz. The R-Bus reset lines can be used to reset just the core subsystem or both the core and I/O subsystems.

The R-bus 1 also provides for error detection and error reporting. As described in greater detail hereinafter, the R-Bus error reporting lines can be used to implement a serial error reporting protocol.

R-Bus data transfer lines that are only driven by the current bus master are protected by parity lines with at most eight lines protected by one parity line. The parity used may be odd or even, but is selected so that if all the protected lines and the parity line are high, then the parity is correct.

Certain R-bus lines are wire-ORed so as to be driven by multiple boards. R-Bus lines that can be driven by multiple boards are replicated in order to provide error detection. The original signal and the replicated signal are compared with any non-coincidence of the two signals causing an error signal to be generated.

Figure 2:
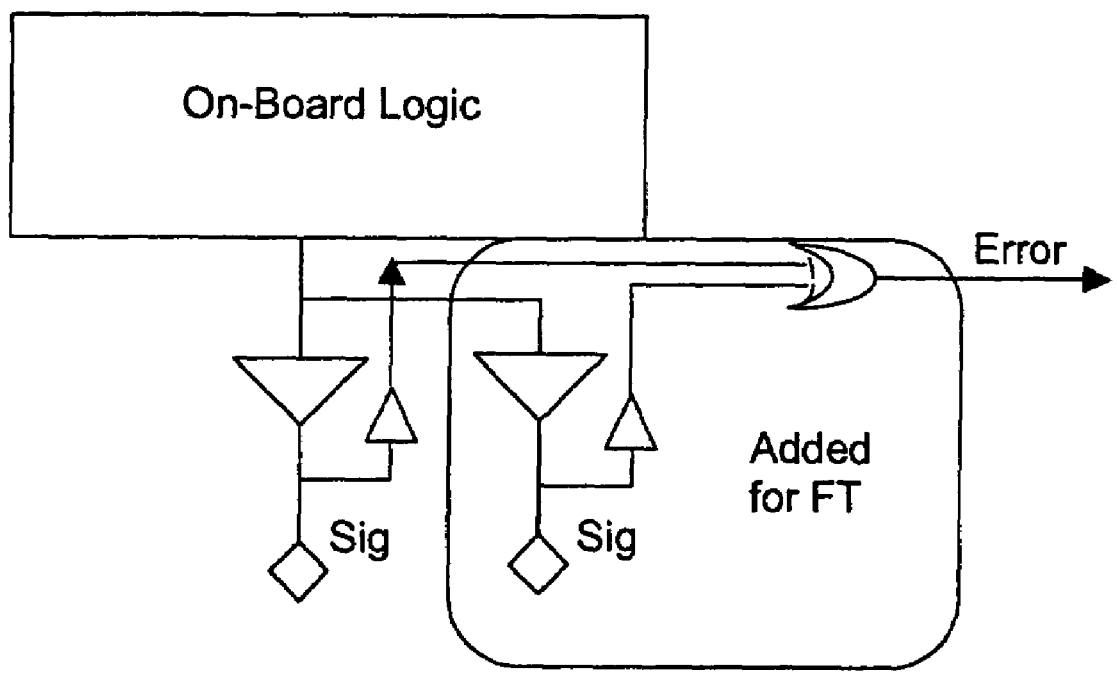
FIG. 2 is a circuit diagram of a redundant signal implementation used to provide detection of backplane signaling errors.

FIG. 2 shows a representative implementation of redundant signal error checking. In FIG. 2, latches required to interface to the R-Bus 1 are omitted. For maximum fault coverage, replicated signals use different transceiver packages. In a preferred embodiment, the following signals, which cannot be checked with parity because they implement wired-OR functions, are duplicated to provide detection of backplane signaling errors. The signal name of each redundant signal is "r"_ followed by the original signal name: r_status_n [4:0]; r_arb_n[4:0]; r_reqh_n; r_reql_n; and r_resp_n.

In a preferred embodiment, R-Bus signals, with a small number of exceptions, use BTL voltages and currents defined in IEEE P1194.1. Typical BTL levels are +2V (high) and +0.9V (low). A few signals (bus_clock, bus_id, slot_id[ ], and bus_disable_n) use TTL levels. Typical TTL levels are +2.4V (high) and +0V (low). The R-Bus 1 provides ground (0V reference), +5V, and +3.3V power supplies. All data transfer and arbitration. signals are synchronous to the rising edge of the bus_clock signal.

The R-Bus signals are divided into four groups: data transfer, arbitration, system services, and diagnostic. The data transfer lines transfer address, data, and status, and define the type of bus transaction (read, write, invalidate, etc.) to be executed. The arbitration lines control bus acquisition. System services lines provide miscellaneous global information to all units within the system. The diagnostic lines are output-only signals that provide information useful in system debugging. Table 1 lists all R-Bus signals. A number of spare lines are reserved for future use. In Table 1 and in the following description, signal names do not use uppercase letters. The designation "_n" at the end of a signal name indicates the signal is active-low, "_p" at the end of a signal name indicates the signal carries parity information and "r_" at the beginning of a signal name indicates the signal carries redundant information for error detection.

Figure 3:
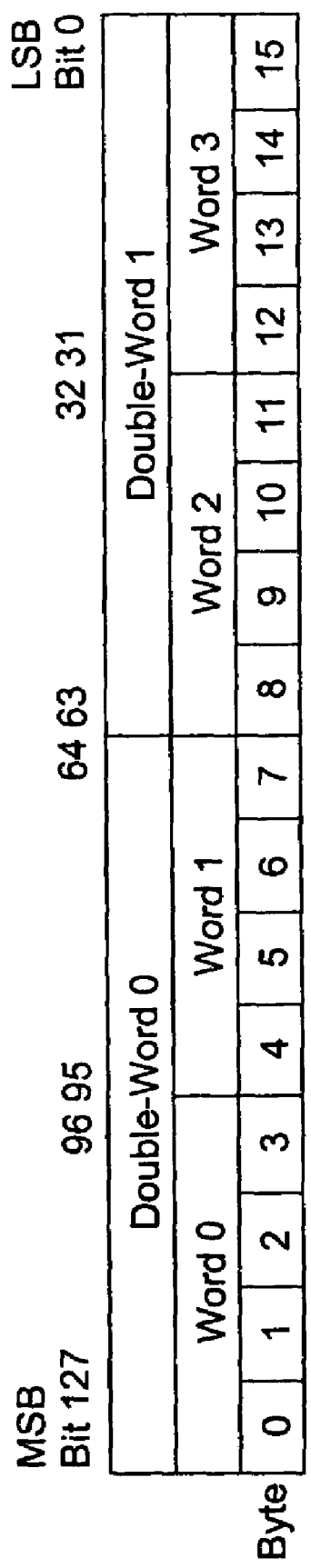
FIG. 3 is a diagram illustrating a preferred byte ordering on the backplane bus.

The R-Bus 1 is, by convention, big-endian. As a result, bytes, words, and double words are ordered on the bus as shown in FIG. 3. The R-Bus 1, however, does not require big-endian byte ordering, but could also support little endian systems.

TABLE 1

R-Bus Signal List

| Name | Level | Description | Lines | Totals |
|---|---|---|---|---|
| Data Transfer | | | | |
| data_addr_n[127:0] | BTL | Data/address/command bus | 128 | |
| data_addr_p[15:0] | BTL | Data/address/command bus byte parity | 16 | |
| src_id_n[6:0] | BTL | Source Identifier | 7 | |
| src_id_p | BTL | Source identifier parity | 1 | |
| dest_id_n[6:0] | BTL | Destination identifier | 7 | |
| dest_id_p | BTL | Destination Identifier parity | 1 | |
| cntrl_n[3:0] | BTL | Bus control field | 4 | |
| cntrl_p | BTL | Bus control parity | 1 | |
| status_n[3:0] | BTL | Transaction status | 4 | |
| r_status_n[3:0] | BTL | Redundant transaction status | 4 | |
| Subtotal | | | | 173 |
| Arbitration | | | | |
| arb_n[4:0] | BTL | Arbitration competition network | 5 | |
| r_arb_n[4:0] | BTL | Redundant arbitration competition network | 5 | |
| class_n[2:0] | BTL | Arbitration class | 3 | |
| r_class_n[2:0] | UTL | Redundant arbitration class | 3 | |
| bus_busy_n | BTI | Bus busy during next cycle | 1 | |
| r_bus_busy_n | BTL | Redundant bus busy during next cycle | 1 | |
| inherit_n | BTL | Inherit during next cycle | 1 | |
| r_inherit_n | BTL | Redundant inherit during next cycle | 1 | |
| Subtotal | | | | 20 |
| System Services | | | | |
| bus-clock | TTL | Bus clock | 1 | |
| slot_id[4:0] | TTL | Physical backplane slot number | 5 | |
| board_disable_n | TTL | Board disabled | 1 | |
| rst_n[2:0] | BTL | Reset bus | 3 | |
| ern_n[3:0] | BTL | Error reporting network | 4 | |
| Subtotal | | | | 14 |
| Diagnostic | | | | |
| snoop_busy_n | BTL | Snoop logic busy | 1 | 1 |
| Spares | | | | |
| spare[16:0] | | Spare lines reserved for future use | 17 | 17 |
| Total | | | 225 | 226 |

All R-Bus parity bits are defined such that an undriven bus yields correct parity. Bus lines are terminated such that when they are not driven they float to a high signal level. Thus, when all bits in a field, including the parity bit are high, the field is considered to have correct parity.

The functions of the various bus lines within each group of bus lines will be described in greater detail.

The data transfer bus lines are used by bus transactions. The lines data_addr_n[127:0] transmit 8-128 bits of data during data cycles, or a 36-bit address and a 4-bit command during address/command cycles. Each of the lines data_addr_p[15:0] transmits parity for one group of eight data_addr_n[ ] lines. Each data_addr_p[i] line checks data_addr_n[127−8i:120−8i], as shown in Table 2. A data_addr_p line is high if an even number of bits in the corresponding data_addr_n[ ] byte are high. A data_addr_p line is low if an odd number of bits in the corresponding data_addr_n[ ] byte are high.

TABLE 2

Data/Address Parity Field

| Parity Signal . . . | Checks |
|---|---|
| data_addr_p[0] | data_addr_n[127:120] |
| data_addr_p[1] | data_addr_n[119:112] |
| data_addr_p[2] | data_addr_n[111:104] |
| data_addr_p[3] | data_addr_n[103:96] |
| data_addr_p[4] | data_addr_n[95:88] |
| data_addr_p[5] | data_addr_n[87:80] |
| data_addr_p[6] | data_addr_n[79:72] |
| data_addr_p[7] | data_addr_n[71:64] |
| data_addr_p[8] | data_addr_n[63:56] |
| data_addr_p[9] | data_addr_n[55:48] |
| data_addr_p[10] | data_addr_n[47:40] |
| data_addr_p[11] | data_addr_n[39:32] |
| data_addr_p[12] | data_addr_n[31:24] |
| data_addr_p[13] | data_addr_n[23:16] |
| data_addr_p[14] | data_addr_n[15:8] |
| data_addr_p[15] | data_addr_n[7:0] |

During all address/command and data cycles, the field src_id_n[6:0] carries the 7-bit module number of the current master. The portion src_id_n[6:2] is the slot ID of the module. The portion src_id_n[1:0] identifies one of four logical modules which may share a common slot. The signal src_id_p transmits a parity check bit for the src_id_n[ ] field. The signal src_id_p is high if an odd number of bits in the src_id_n[ ] field are high, and is low if an even number of bits in the src_id_n[ ] field are high.

During response transactions, the field dest_id_n[6:0] carries the 7-bit module number of a destination module. The portion dest_id_n[6:2] is the slot ID of the destination module. The field dest_id_n[1:0] identifies one of four logical modules which may share a common slot. A dest_id_n[ ] value of 0 (value if not driven) is used when the transaction is not directed at a specific module but uses the address to determine the slave modules.

The signal dest_id_p transmits a parity check bit for the dest_id_n[ ] field. The signal dest_id_p is high if an odd number of bits in the dest_id_n[ ] field are high. The signal dest_id_p is low if an even number of bits in the dest_id_n[ ] field are high.

A bus master transmits control information on the cntrl_n [3:0] lines which defines the state of the data transfer lines on the current bus cycle.

The signal cntrl_n[0] functions as a data-valid signal, data_valid_n, asserted whenever the data_addr_n[ ] lines contain data. The signal cntrl_n[1] functions as an address-valid signal, addr_valid_n, asserted whenever the data_addr_n[ ] lines contain a command and, possibly, an address. The signal cntrl_n[2] functions as a signal indicating more data to come, more_data_n asserted on any bus transaction that is not the last cycle, whether that cycle is a data cycle or an address/command cycle; and the signal cntrl_n[3] functions as a data error signal, data_err_n, asserted whenever the data currently on the data-addr_n[ ] lines is known to contain errors. A memory, for example, would assert data_err_n during a read response transaction if an un-correctable error occurred during the memory fetch. The signal cntrl_p transmits a parity check bit for the cntrl_n[ ] field. The signal cntrl_p is high if an even number of bits in the cntrl_n[ ] field are high (negated) and is low if an odd number of bits in the cntrl_n[ ] field are high (negated).

Figure 4:
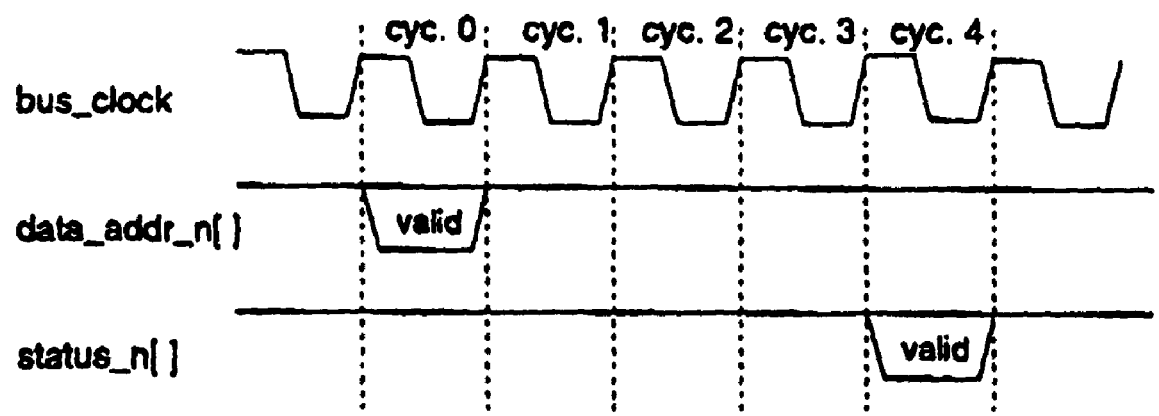
FIG. 4 is a timing diagram illustrating status latency on the backplane bus.

One or more modules may assert one or more status_n[ ] lines in response to a valid address/command or data cycle. The status latency is always four bus cycles, as shown in FIG. 4. Since the status_n[ ] lines implement a wired-OR function, they are protected by redundant lines instead of a parity bit.

The signal status_n[0] functions as an acknowledge signal, ack_n, the signal status_n[1] functions as a not-ready signal, not_ready_n; the signal status_n[2] functions as a "shared" signal, shared_n; and the signal status_n[3] functions as an "intervene" signal, Intervene_n.

A slave asserts ack_n in all status cycles of a transaction to indicate that it has recognized the address or destination ID.

If ack_n is not returned, no module in the system recognizes the address or destination ID. This condition may cause an error to be indicated.

A slave asserts not_ready_n with ack_n in a first status cycle of a transaction if the slave has recognized the address or destination ID, but is temporarily, unable to perform the requested operation. A snooper (i.e., a caching module that is neither master or slave, but monitors the bus transaction and takes action as needed to maintain cache coherency) asserts not_ready_n without asserting ack_n in the first status cycle of the transaction if the snooper cannot maintain cache coherency for the operation. If not_ready_n and ack_n are both asserted in the first status cycle, then the master knows that the transaction has failed. The master may retry the operation at a later time.

One or more modules may assert shared_n in the first status cycle of a read-shared request transaction. A module asserts shared_n to signal it expects to keep a valid copy of the requested block in its cache. The signal shared_n is a diagnostic signal only. It is not used as part of the cache coherency protocol. The read-shared transaction, as well as other specific bus transactions referred to herein, are described in greater detail in the foregoing copending application.

One module only may assert intervene_n in the first status cycle of a read-block request transaction. A module asserts intervene_n to indicate it has a valid dirty or exclusive copy of the requested block in its cache and the memory may no longer contain a valid copy of the block. This causes the memory to abort the read operation and stay off the bus. Instead of memory, the module that asserted intervene_n must then provide the requested data to the bus.

The lines r_status_n[3:0] are duplicates of status_n[ ] for error checking. Modules must always drive the same pattern on r_status_n[ ] as on status_n[ ]. If any bit in r_status_n[ ] ever differs from the corresponding bit in status_n[ ] on a status cycle, then each module that receives that status must signal a fatal error.

The arbitration lines are used to determine which board gains control of the bus, and to restrict control of the bus to one board at a time. The arbitration mechanism is described in greater detail in the foregoing copending application. Since the arbitration lines implement a wired-OR function, they are protected by redundant lines instead of parity bits.

The arb_n[4:0] lines determine the precedence of boards competing for control of the bus. Unlike other lines which run the entire length of the backplane, the arb_n[ ] lines are connected in the binary pattern shown in Table 3. Each board either drives or receives each arb_n[ ] signal depending on its physical location in the backplane. On each board, if slot_id[i]=1, the board asserts arb_n[i], asserting it when competing, negating it otherwise; if slot_id[i]=0, the board receives but does not assert arb_n[i]. For each backplane slot, Table 3 shows which lines the board asserts ("out") and which does not assert ("in").

TABLE 3 arb_n[ ] backplane connections

| Slot | arb_n[4] | arb_n[3] | arb_n[2] | Arb_n[1] | arb_n[0] |
|---|---|---|---|---|---|
| 0 | in | in | in | in | in |
| 1 | in | in | in | in | out |
| 2 | in | in | in | out | in |
| 3 | in | in | in | out | out |
| 4 | in | in | out | in | in |
| 5 | in | in | out | in | out |
| 6 | in | in | out | out | in |
| 7 | in | in | out | out | out |
| 8 | in | out | in | in | in |
| 9 | in | out | in | in | out |
| 10 | in | out | in | out | in |
| 11 | in | out | in | out | out |
| 12 | in | out | out | in | in |
| 13 | in | out | out | in | out |
| 14 | in | out | out | out | in |
| 15 | in | out | out | out | out |
| 16 | out | in | in | in | in |
| 17 | out | in | in | in | out |
| 18 | out | in | in | out | in |
| 19 | out | in | in | out | out |
| 20 | out | in | out | in | in |
| 21 | out | in | out | in | out |
| 22 | out | in | out | out | in |
| 23 | out | In | out | out | out |
| 24 | out | out | in | in | in |
| 25 | out | out | in | in | out |
| 26 | out | out | in | out | in |
| 27 | out | out | in | out | out |
| 28 | out | out | out | in | in |
| 29 | out | out | out | in | out |
| 30 | out | out | out | out | in |
| 31 | out | out | out | out | out |

When board competes for bus ownership it drives a logic one on all of its arb_n[ ] outputs. The arb_n[ ] network carries this signal to all lower numbered slots. At the same time the board receives signals on the arb_n[ ] lines from all higher numbered slots. Thus, the board can determine immediately whether or not it wins the arbitration.

The lines r_arb_n[4:0] are duplicates of arb_n[ ] for error checking. Modules must always drive the same pattern on r_arb_n[ ] as on arb_n[ ]. If any bit in r_arb_n[ ] ever differs from the corresponding bit in r_arb_n[ ], then a fatal error is signaled.

The lines class_n[2:0] implement round-robin arbitration for three classes of competitors which want the bus for three different types of transactions. The class_n[0] functions as a response signal, resp_n, the class_n[1] functions as a low-priority request signal, reql_n and the class_n[2] signal functions as a high-priority request signal.

Modules assert the resp_n line to request the bus for a response transaction. This line is used for all transactions that "give up cache ownership" including write-no-snoop (castouts), write-snarf (read response and update memory), some write-partial, read-block-response, read-partial-response, and read-retry-response transactions.

Modules assert the reql_n line to request the bus for a low-priority request transaction. This line is used for all transactions that "give up cache ownership," including read-shared-request, read-browse-request, read-exclusive-request, read-exclusive-request, read-partial-request, invalidate, some write-partial, and write-clobber transactions.

Modules assert the reqh_n line to request the bus for a high-priority request transaction. If high priority is used for previously low-priority request transactions that have received excessive number of rejections by not ready status.

The lines r_class_n[2:0] are duplicates of class_n[ ] for error checking. Modules must always drive the same pattern on r_class_n[ ] as on class_n[ ]. If any bit in r_class_n[ ] ever differs from the corresponding bit in class_n[ ], then a fatal error is signaled.

The current bus master asserts bus_busy_n to signal that it will retain ownership of the bus on the next cycle. This prevents any other unit from taking control of the bus until after the current master is done. The signal bus_busy_n is not asserted on the last cycle of any transaction. For a single-cycle transaction such as read-request or invalidate, bus_busy_n is not asserted at all. The r_bus_busy_n line is a duplicate of bus_busy_n for error checking. Modules must always drive the same level on r_bus_busy_n[ ] as on bus_busy_n[ ]. If r_bus_busy_n[ ] ever differs from bus_busy_n[ ], a fatal error is signaled.

The current bus slave asserts inherit_n to signal that it will take ownership of the bus after the completion of the current transaction. This signal prevents any other unit from taking control of the bus until after the current slave changes into bus master. The signal inherit_n can be asserted during any cycle of a response transaction. Only the module addressed by the dest_id_n[ ] signals can assert inherit_n. The r_inherit_n line is a duplicate of inherit_n for error checking. Modules must always drive the same level on r_inherit_n[ ] as on inherit_n. If r_inherit_n[ ] ever differs from inherit_n, a fatal error is signaled.

The system services lines provide miscellaneous global signals to all backplane slots.

The bus clock signal provides a TTL-level 25 MHz system clock. All R-Bus signals except board_disable_n, slot_id[ ], and bus_id are synchronous to the rising edge of bus_clock. The bus_clock signal is generated on a central clock board and fanned out so that each backplane slot receives an individual copy of the clock signal. To minimize skew, the individual clock lines are routed on the backplane such that they all have equal length.

A module asserts the TM-level signal board_disable_n asynchronously to notify all other modules in the system that it is disabled because of a condition such as a clock failure or the on-board reset signal is asserted. All other R-Bus outputs must be negated while board_disable_n is asserted. Any condition that asynchronously disables the backplane transceivers also asynchronously asserts this board_disable_n signal. Other modules respond to board_disable_n being asserted by generating an error report to notify software of a possible error condition.

The backplane provides, via the slot_id[ ] pins, a binary number to each board representing the number of the slot in which the board is located. Boards receive slot_id[ ] using a TLL buffer with pull-up resistors on the inputs. The backplane represents logic ZERO as a connection to ground, and logic ONE as no connection. In a preferred embodiment, allowable slot ID values are 1-30. A slot_id[ ] value of 0 is not supported because this ID is reserved as ID value used on the dest_id[ ] value used when no particular board is selected. A slot_id[ ] value of 31 ($1F_{16}$) is not supported because this ID is reserved for broadcast and local ID.

The signals rst_n[2:0] reset the core and I/O subsystems per Table 4. The encoding is such that the failure of any single bit cannot cause a spurious, system reset. All R-Bus modules receive rst_n[1:0]. Modules which control non-slave I/O subsystems must also receive rst_n[2]. Any module may drive rst_n[2:0]. A central reset source, such as the clock board, may also drive rst_n[2:0]. The minimum duration of the conjunction of rst_n[0] and rst_n[1], or of rst_n[0], rst_n[1], and rst_n[2] is 1 cycle.

TABLE 4 rst_n[2:0] encoding

| rst_n[ ] | | | |
|---|---|---|---|
| 2 | 1 | 0 | Action |
| x | x | 0 | None |
| x | 0 | x | None |
| 0 | 1 | 1 | Reset core subsystem |
| 1 | 1 | 1 | Reset core and I/O subsystems |

The signals ern_n[3:0] transmit error report and recovery data. The communication protocol used, report formats, and error codes are described more fully hereinafter.

The signal ern_n[0] functions as an error interrupt signal, err_int_n. A module asserts err_int_n to notify all other modules in the system that a non-fatal error, such as a correctable ECC error or a bus time-out, has occurred. The signal ern_n[1] functions as a redundant error interrupt signal, r_err_int_n. In most cases ern_n[1] is treated like the other redundant signal lines, except for boards that have multiple independent modules, in which error detecting logic in one half of the board signals error interrupts on ern_n[0] while the logic in the other half signals error interrupts on ern_n[1]. For example, on a dual processor unit (DPU) board which has two independent CPUs, CPU-A drives ern_n[0] while CPU-B drives ern_n[1].

The signal ern_n[2] functions as a fatal error signal, err_fatal_n. A module asserts err_fatal_n to notify all other modules in the system that the data on the bus is corrupted and a fatal error, such as an uncorrectable ECC error, a bus parity error, or FRC failure, has occurred. The signal ern_n[3] functions as a redundant fatal error signal, r_err_fatal_n. In most cases ern_n[3] is treated like the other redundant signal lines, except for boards that have multiple independent modules, in which error detecting logic in one half of the board signals error interrupts on ern_n[2] while the logic in the other half signals error interrupts on ern_n[3]. For example on DPU board which has two independent CPUs, CPU-A drives ern_n[2], while CPU-B drives ern_n[3].

The diagnostic lines, including snoop_busy_n, provide information that can be helpful in debugging the R-Bus system. They are not necessary for correct bus operation. They are output-only for all R-Bus modules and may be received only by test equipment.

A module gains control of the R-Bus data transfer lines using the R-Bus arbitration protocol. The module then becomes the bus master. The master issues at least one bus transaction and then releases the bus for use by the next master, which may be the same module. A bus transaction transfers information from the master to one or more slave modules using the data transfer lines. The master and slave may be the same module.

A transaction is a sequence of consecutive cycles using one of the following transaction formats: one address/command cycle; one address/command cycle immediately followed by one data cycle; one address/command cycle immediately followed by 4 data cycles, one data cycle; or 4 data cycles, where the block size is 64 bytes.

A bus master asserts more_data_n (cntrl_n[2]) on all cycles that have more data in the bus transaction. The signal more_ data_n is de-asserted on the last cycle of the bus transaction. If a transaction contains one cycle, then the master de-asserts more_data_n on that cycle.

Associated with each transaction is a sequence of consecutive status cycles, with one status cycle for each address/command cycle or data cycle. A status cycle always occurs four bus cycles after its associated address/command or data cycle. Status cycles can overlap data cycles of a block transaction and can also overlap the address/command or data cycles of subsequent transactions.

A transaction type is identified by the address/command cycle or, if there is no address/command cycle, by the number of data cycles.

If a master does not assert bus_busy_n on the first cycle it has mastership, then the transaction must be one cycle, or the master may not issue a transaction. If a master asserts bus_busy_n on the first cycle it has mastership, then it retains mastership through the first cycle that bus_busy_n is negated.

A master normally negates bus_busy_n in the last cycle of a transaction, allowing other modules to arbitrate for mastership. A master may keep mastership for multiple transactions, called bus hogging, by continuing to assert bus_busy_n.

Bus hogging should be used carefully, because of the risk that other modules will be unable to access the R-Bus for too long a time.

After a module is granted the bus, idle cycles may precede or follow a transaction. A module may acquire mastership and not issue a transaction. However, bus masters are not allowed to insert idle cycles within a transaction.

If a transaction contains an incorrect number of cycles for its type or contains an address/command cycle or idle cycle where a data cycle is required, then the transaction is erroneous. Any module may signal an error if it detects an erroneous transaction on the bus.

Bus transactions are used to implement reads and writes of data in particular memory locations. The R-Bus protocol distinguishes two types of memory: cacheable memory and registers. Cacheable memory may only be read or written using block transactions. A block in cacheable memory may also exist in caches in the system. Registers may only be read or written using partial transactions. Registers may not be cached. Registers may be used to control or record hardware operation or to access non-cacheable memory arrays. Provision may also be made for other additional types of memory.

R-Bus transactions can be classified as block transactions or partial transactions. Block transactions transfer or affect memory blocks. A block is 64 bytes aligned on a 64 byte boundary. Partial transactions access registers. A write-partial transaction or read-partial request transaction specifies a transfer size of 1, 4, or 8 bytes.

All transfers are "naturally" aligned. That is, all blocks begin on a block address boundary, all double-words begin on a modulo-8 address boundary, and all words begin on a modulo-4 address boundary.

During partial transaction data cycles not all of the 128 data_addr_n[ ] lines are used: 64 bits are defined for double-word transfers, 32 bits for word transfers, and 8 bits for byte transfers. The position of the valid data on the bus depends on the address of the data being transferred. The ordering shown in FIG. 3 also defines which bus lines are valid for any partial transfer. All bus lines not transferring data are undefined, but have correct parity.

Block transfers deliver the quadword at the beginning of the block (the quadword with the lowest address within the block) first, then progress sequentially through the quadwords that form the block.

Bus transactions occur using three module types: caching processors, non-caching processors, and memory modules. A caching processor is an active module that caches memory blocks and "snoops" (monitors) the bus to maintain cache coherency. A non-caching processor is an active module that does not cache memory blocks. A memory module is a passive repository for data. Data in memory can be read or written. All three module types may contain registers.

Modules may have additional types besides those described, but may still behave like one of the foregoing module types. For example, an I/O board may behave like a non-caching processor, if it contains an active I/O processor, or like a memory module, if it implements passive memory-mapped I/O.

Write and invalidate operations are both done with a single bus transaction (unless a not-ready status causes a retry). Read operations, however, are split into two bus transactions: a request transaction which transfers the memory address and command from a processor to memory, and a response transaction which transfers the requested data back to the processor. The response will be one of the following: a read-partial response, a read-block response, a read-retry response, or a write-snarf.

During the request transaction a processor is the master and the memory is the slave. During the response transaction, the memory is the master and the processor is the slave. The src_id_n[ ] field specified in the request becomes the dest_id_n[ ] field in the response.

For a read-block request, if another processor has the requested block in its cache with the block tagged dirty, it intervenes in the request transaction and transfers the requested data to the requester and to memory with a write-snarf transaction. If another processor has the requested block exclusive in its cache, it may intervene and transfer the requested data with a read-block response transaction.

The response begins six or more bus cycles after the request completes. During the time between request and response the bus is free to carry other traffic. The six-cycle minimum latency is required to allow memory to test intervene_n and abort its response if a snooper intervenes.

After a module issues a read-request on the bus, the module may not issue another read request on the bus until a read response is received for the already issued request.

A write-partial transaction is normally directed at a single destination module. However, a write-partial transaction may also be a multicast or broadcast, directed to a set of modules or to all modules that implement a certain register or memory location. For example, a particular address may indicate a broadcast to a certain type of board.

Read requests may not be recognized by more than one slave. A multicast or broadcast read request is erroneous. Furthermore, block write requests may not be recognized by more than one slave. A multicast or broadcast block write request is erroneous.

There are three basic transaction outcomes: Transaction OK, No acknowledgment, and Not ready. If an outcome of a transaction "transaction OK", then transaction succeeds. The transaction is acknowledged (ack_n is asserted) on all status cycles. Also, if a not-ready outcome is possible, not_ready_n must be negated on the first status cycle. If an outcome of a transaction is no acknowledgment or not ready, then the transaction fails.

In the case of No acknowledgement, the transaction is not acknowledged (ack_n is negated) on any status cycle. If ack_n is negated on the first status cycle (a no acknowledgment result), then no module may recognize the specified address or destination ID. If there are multiple status cycles and ack_n is negated on any status cycle, then the data transferred may not be accepted by any slave or snooper.

A snooper shall not drive ack_n; acknowledging is done by any slaves. All modules participating in the transaction determine the not-ready outcome from the received status; not_ready_n and ack_n must both be asserted in the first status cycle.

In the case of Not ready, not_ready_n is asserted with ack_n on the first status cycle. A not-ready outcome indicates that a slave or snooper is temporarily not ready and that the transaction may be retried. A not-ready outcome is not possible and not allowed for a read response transaction. A not-ready outcome is allowed for a write-snarf transaction, which may occur in response to a read-block response. If a transaction has a not-ready outcome, then the memories and caches in the system must not change state because of the transaction.

For read operations, a read-retry response may be returned to indicate that the slave is temporarily not ready but was unable to indicate not-ready in time for the first status cycle of the read request. A module may retry a transaction if the transaction fails or if a read-retry response is received after a read request. If a multi-cycle transaction fails, the master must nevertheless issue all remaining cycles in the transaction.

If a particular transaction type is not snooped, then a module or board may bypass the R-Bus when performing those transactions within the module or board. The module or board may also use the R-Bus in the normal way. If a particular transaction type is snooped, then all transactions of that type must be issued via the R-Bus to maintain cache coherency.

Each module contains several time-out counters, including arbitration time-out counters, retry time-out counters, and a response time-out counter. When a module starts arbitrating, the module counts the number of bus cycles that it has been requesting access to the bus without gaining access. If the arbitration time-out counter is enabled and the count exceeds an implementation defined threshold, then the module shall signal an error. When a module performs a write (including write-snarf), invalidate, or read-request operation, the module counts the number of times the transaction status indicates not ready or that a read-retry response is received for the same read-request operation. If the retry time-out counter is enabled and the count exceeds an implementation defined threshold, then the module shall signal an error. When a module performs a read operation, the module counts the number of bus cycles between a request and a response. If the transaction status for the read request indicates no acknowledgment or not ready or if a response is received (including a read-retry response), then the count is cleared. If the response time-out counter is enabled and the count exceeds an implementation defined threshold, then the module shall signal an error.

A transaction may not be interrupted in normal operation. Transactions can be interrupted by a R-Bus reset, a local module reset, or by a board being disabled. Interrupted transactions are erroneous and other module on the R-Bus may detect errors.

Cache coherency is a desired property of a system containing multiple caches. A system has cache coherency if no cache contains an obsolete value for a block. However, memory may contain an obsolete value for a block. Cache coherency is maintained through a set of rules called a cache coherency protocol. The R-Bus provides mechanisms used to implement a cache coherency protocol.

The following terms are used to describe a state of a memory block with respect to a particular cache:

Invalid: the cache does not contain the block.

Clean: the cache contains the block and the cached block is the same as the block in memory. A clean block is in either the shared or exclusive state.

Shared: the cache contains the block, the block is clean, and other caches may also contain the block in the shared state.

Exclusive: the cache contains the block, the block is clean, and other caches do not contain the block.

Modified (Dirty): the cache contains the block and the cached block is more recent than the block in memory (memory is obsolete). Other caches do not contain the block.

A caching module snoops a bus transaction when it is neither master or slave, but monitors the transaction and takes action as needed to maintain cache coherency. Non-caching modules may not snoop and may omit snooping logic. Snoopers take the below described actions to maintain cache coherency.

If a snooper holds in cache a block that is in the dirty state, then the snooper must intervene in any read-shared request, read-exclusive request, read-browse request, or read-exclusive-IO request transaction addressed to that block. If the received transaction status is transaction OK, then the snooper must supply the requested block using a write-snarf transaction. The write-snarf transaction updates the memory as well. If the request was a read-exclusive request or read-exclusive-IO request, then the snooper must invalidate the block in its cache after the write-snarf transaction succeeds. If the request was a read-shared request, then the snooper may invalidate the block or may continue to cache the block in the shared state. If the request was a read-browse request, then the snooper may invalidate the block or may continue to cache the block in the shared or exclusive state.

If a snooper caches a block in the exclusive state, then the snooper may intervene in any read-shared request, read-exclusive request, read-browse request, or read-exclusive IO request transaction. If the received transaction status is transaction OK, then the snooper must supply the requested block using a read-block response. If the request was a read-exclusive request or read-exclusive-IO request, then the snooper must invalidate the block in its cache after the read-block response succeeds. If the request was a read-shared request, then the snooper may invalidate the block or may continue to cache the block in the shared state. If the request was a read-browse request, then the snooper may invalidate the block or may continue to cache the block in the shared or exclusive state.

If a write-clobber transaction succeeds, then all snoopers that cache the block must invalidate the block and abort all pending write-block (castouts) to that block. If an invalidate transaction succeeds, then all snoopers that cache the block must invalidate the block.

A snooper must assert not_ready_n in a first status cycle of the transaction if the snooper is unable to snoop the transaction. A snooper must not assert ack_n. Acknowledging is done by any slave modules. A snooper must not change its cache state in response to a transaction until the transaction and any response from the snooper succeed.

Table 5 lists all R-Bus transactions and provides for each transaction the number of address/command cycles, the number of data cycles, the total number of cycles (not including status cycles), whether dest_id_n[ ] is valid during the transaction, whether the transaction is a block or partial transaction, and whether the transaction is snooped.

TABLE 5

R-Bus Transactions

| Transaction | A/C Cycles | Data Cycles | Total | Dest_id_n [] | Block/ Partial | Snooped |
|---|---|---|---|---|---|---|
| Writes | | | | | | |
| Write-partial | 1 | 1 | 2 | No | Partial | No |
| Write-clobber | 1 | 4 | 5 | No | Block | Yes |
| Write-no-snoop | 1 | 4 | 5 | No | Block | No |
| Write-snarf | | 4 | 5 | Yes | Block | No |
| Reads | | | | | | |
| Read-Partial request | 1 | 0 | 1 | No | Partial | No |
| Read-Shared request | 1 | 0 | 1 | No | Block | Yes |
| Read-Browse request | 1 | 0 | 1 | No | Block | Yes |
| Read-Exclusive request | 1 | 0 | 1 | No | Block | yes |
| Read-Exclusive-IO request | 1 | 0 | 1 | No | Block | yes |
| Invalidate | 1 | 0 | 1 | No | Block | yes |
| Responses | | | | | | |
| Read-Partial response | 0 | 1 | 1 | Yes | Partial | No |
| Read-Block response | 0 | 4 | 4 | Yes | Block | No |
| Read-Retry response | 1 | 0 | 1 | Yes | Either | No |

As described earlier, a bus transaction contains zero or one address/command cycles; zero, one, or 4 data cycles, and one status cycle for each address/command or data cycle.

An address/command cycle is defined by addr_valid_n asserted. During address/command cycles:

cntrl_n[3:0] is xx10$_2$;
cntrl_n[0]: data_valid n is 0;
cntrl_n[1]: addr_valid n is 1;
cntrl_n[2]: more_data_n is 1 if there are more data cycles in the transaction;
cntrl_n[2]: more_data_n is 0 if this is a single cycle transaction; and
cntrl_n[3]: data_err_n is 1 if the address is corrupt and should not be used.

For example, data_err_n is set if a parity error was detected and reported earlier in the address path. If data_err_n is asserted for any cycle in a transaction, then the entire block may be bad. The master must signal an error. Slaves and snoopers may signal an error.

Figure 5:
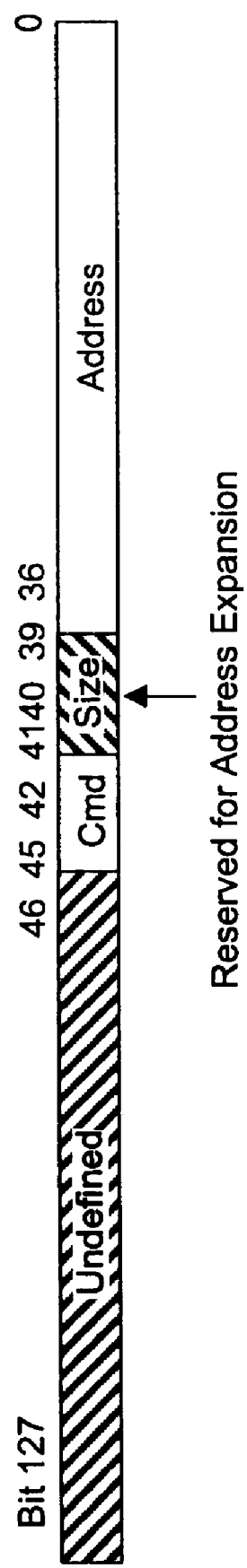
FIG. 5 is a diagram of address information carried on data address lines during address/command cycles.

During address/command cycles, data_addr_n[127:0] contain address and command information as shown in FIG. 5. The command field, data_addr_n[45:42], encodes the transaction type per Table 6. For block transfers of 64 bytes, data_addr_n[35:6] transmits the most significant bits of the block address; data_addr_n[41:40] and data_addr_n[5:0] are undefined. For read and write-partial transfers, data_addr_n[41:40] encodes the data size per Table 7, and the data_addr_n[ ] bits specified in the table transmit the address, while the least significant address bits are undefined. The signals data_addr_n[39:36] are undefined and reserved for future address expansion. Higher-level protocols may use the undefined bits data_addr_n[127:46] to transmit additional information without affecting the operation of the R-Bus, as long as correct parity is provided.

TABLE 6

Command Field Encodings

| data_addr_n[45:42] | | | Operation | |
|---|---|---|---|---|
| binary | hex inverted | hex positive | Formal Name | Alternate Names |
| 1110 | C7 | | Read-Retry Response | delayed not_ready_n |
| 1101 | CB | 20 | Invalidate | |
| 1100 | CE | 31 | Read-Partial Request | Control register read request |
| 1011 | D3 | 2C | Read-Browse Request | Block fetch no state change (rd_sh_IO) |
| 1010 | D7 | 28 | Read-Shared Request | Block fetch |
| 1001 | DB | 24 | Read-Exclusive-IO Request | Block fetch-invalidate from IO |
| 1000 | DF | 20 | Read-Exclusive Request | Block fetch-invalidate |
| 0100 | EE | 11 | Write-Partial | Control register write |
| 0011 | F3 | 0C | Write-no-Snoop | Cast-out |
| 0010 | F7 | 08 | Write-Snarf | Intervention data, update memory |
| 0001 | FB | 04 | Write-Clobber | Block Write-invalidate (wr-nuke) |

TABLE 7

Data Size Encodings for Partial requests

| data-addr-n[41:40] | Data Size | Address Bits Defined |
|---|---|---|
| 11 | Double Word | [35:3] |
| 10 | Reserved | |

TABLE 7-continued

Data Size Encodings for Partial requests

| data-addr-n[41:40] | Data Size | Address Bits Defined |
|---|---|---|
| 01 | Word | [35:2] |
| 00 | Byte | [35:0] |

Also during address/command cycles, src_id_n[6:0] contains the slot ID of the master and the module ID. For read-block response, read-partial response, read-retry response, and write-snarf transactions, dest_id_n[6:0] is valid. For invalidate, read-exclusive request, read-shared request, read-browse request, read-exclusive IO request, partial read request, write-clobber, write-no-snoop, and partial write transactions, dest_id_n[6:0] is undriven (logical slot 0).

A data cycle is defined by data_valid_n asserted. During data cycles:

cntrl_n[3:0] is xx$01_2$;
cntrl_n[0]: data_valid_n is 1;
cntrl_n[1]: addr_valid_n is 0;
cntrl_n[2]: more_data_n is 1 if there are more data cycles in the transaction;
cntrl_n[2]: more_data_n is 0 if this is a last cycle of the transaction; and
cntrl_n[3]: data_err_n is 1 if the address is corrupt and should not be used.

If data_err_n is asserted for any data cycle in a block transaction, then the entire block may be bad. The master shall signal an error. Slaves and snoopers may signal an error.

Also during data cycles, data_addr_n[127:0) contain 8-128 valid bits of data. The field src_id_n[6:0] contains the slot ID and module ID of the master. The field dest_id_n[6:0] is valid for write-snarf, read-partial response, read-retry response, and read-block response transactions and is undriven (slot 0) for write-partial, write-clobber, and write-no-snoop transactions.

Status cycles follow address/command and data cycles. Four cycles after a master does an address/command or data cycle, the addressed slave, and possibly other modules assert one or more status_n lines. The module which initiated the transaction (it may no longer be the master) samples the status_n[ ] lines to find if the transaction has completed successfully, and other information it needs to maintain cache coherency.

The status returned four cycles after an address/command cycle indicates whether the transaction is acknowledged, whether any slave, snooper, or snarfer aborts the transaction, and any information needed regarding cache coherency. The status returned four cycles after a data cycle contains only one valid bit: ack_n indicates whether the slave accepted the data or not. All the other lines, that is, status_n[3:1] are undefined.

To acknowledge a block transfer a slave must assert ack_n during all data cycles in the block. If a slave asserts ack_n during the first cycle of a block, then negates it later in the block, it is erroneous and any module may signal an error.

Modules are required to monitor certain bus signals for errors and to signal certain classes of errors. In other cases, modules may detect and signal an error, but are not required to do so. In a preferred embodiment, all modules are required to check for the following error cases:

Parity errors on the cntrl_n[ ], and cntrl_p lines every cycle;
Signal mismatches on the redundant status_n[ ] lines every cycle;
Parity for on data_addr_n[47:0] on every address/command cycle;
For partial accesses, addressed slaves must check parity on all defined portions of data_addr_n[ ]; and
For block transfers, addressed slaves must check parity on data_add_n[127:0].

Also, slaves and snoopers must compare the status lines with the redundant status lines on every status cycle and signal an error if the two sets of lines don't match. All modules may but are not required to check for parity on data_addr_n[127:0] on every cycle.

A master must signal an error if it sends corrupt data and asserts data_err_n on a data cycle. A module may signal an error in the following error cases:

No module acknowledges a transaction by asserting ack_n;
A transaction contains an incorrect number of cycles;
A transaction contains an address/command cycle or idle cycle where a data cycle is expected;
A transaction cycle has both addr_valid_n and data_valid_n asserted;
A write-partial or read-partial request transaction specifies a transfer size that is reserved or is not supported by the slave;
The signal data_err_n is asserted on a data cycle;
A address/command cycle and the command code is a reserved value;
The signal src_id_n changes during a transaction;
The signal dest_id_n[ ] is valid and changes during a transaction; and
Multiple slaves respond to one read request.

Reading or writing using an unaligned memory address may be considered an error by a higher-level specification and such a specification may specify that the error be detected and signaled. However, the R-Bus simply ignores address bits 5:0 when transferring a block of 64 bytes.

Appendix A of the foregoing copending application describes the transaction types supported by the R-Bus, including a description, information about the format of the transaction, address/command cycle, data cycles, status cycles, master actions, slave actions, and snooper actions. Appendix B of the foregoing copending application provides timing diagrams for all R-Bus transactions.

The R-Bus architecture may support a wide range of fault resilience options, from simple reliable design, up to complete hardware fault tolerance using: full hardware error detection and recovery. For simplicity, a "basic" limited fault resilience system will be described.

In a preferred embodiment, all errors or anomalous behavior is classified into one of two severity levels based on whether data integrity is compromised. The following defines the error severity levels: error notices and fatal errors.

The error notices are abnormal hardware cases that do not involve corrupt data or loss of data integrity. Error notices are used for minor errors, non-corrupt data, or errors that are not local to the sub-system. These errors are detected in hardware and in some cases hardware also has to do special handling to correct the abnormal behavior. Notice errors also trigger an interrupt so that the condition can be logged in software. Examples of error notices are correctable single bit ECC errors, R-Bus time-outs, or R-Bus protocol failures.

All of these errors are detected and serviced by hardware and the error notification is also propagated to software in the form of an interrupt so that software can log the error and possibly take further action. (An example of further software action would be if hardware detects a correctable ECC error and services the error by correcting the data but software scrubs the location to eliminate the source of the error in memory.)

Detecting a notice level error triggers the following actions: hardware takes corrective action to service the abnormal behavior; hardware assert the R-Bus signal err_int (thereby triggering a software interrupt); hardware logs the error condition in a local error status register. The distribution of the logged information is done via a serial error report.

A fatal error is signaled when hardware detects the use of corrupt data. Fatal errors are serious errors that compromise data integrity. They are errors that mean that the core subsystem can no longer be relied on to function correctly. Examples of fatal errors are uncorrectable memory ECC errors, bus parity errors, and fault redundancy checking (FRC) failures.

Detecting an error of fatal severity triggers the following actions: hardware asserts the R-Bus signal err_fatal (hardware may also assert data_err for errors that are synchronous with the R-Bus transfer such as uncorrectable ECC failures); detecting err_fatal asserted, all boards act to confine the corrupt data within this core sub-system by shutting down IO pathways out of the core system fast enough to prevent the corrupt data of the core from being stored in the IO subsystem; and hardware logs the error condition in a local error status register. The distribution of the logged information is done via the serial error report.

In a basic system, detection of a fatal error should stop the computer from proceeding to allow software to attempt to recover and restart the system. If restart is not advisable, then stopping the computer prevents known corrupt data from entering the IO sub-system. The following is a common fatal error sequence: the error is detected and reported, forcing the IO to shut down; the fatal error interrupt handler wakes up; if the software can localize the error and can recover, it does so and finally restarts the IO; if the software hangs because IO is shut down or because it cannot determine the source or scope of the fault, the system will be shutdown (crash); if the system shuts down (crashes), the error logs are read and analyzed as part of the reboot diagnostics. Ideally, either self-test diagnostics or analyzes of the error can localize the failing agent so it can be disabled.

There are four signals on the backplane for error communication, two err_int signals (err_int_n and r_err_int_n)) and two err_fatal signals (err_fatal_n and r_err_fatal_n). The two sets of signals are routed the same but the signals carry different information. The err_int signals are for less severe errors plus the sending of a serial error message protocol. The separate err_int signals carry different serial message streams. The err_fatal lines are simply pulsed when a fatal error is detected.

Figure 6:
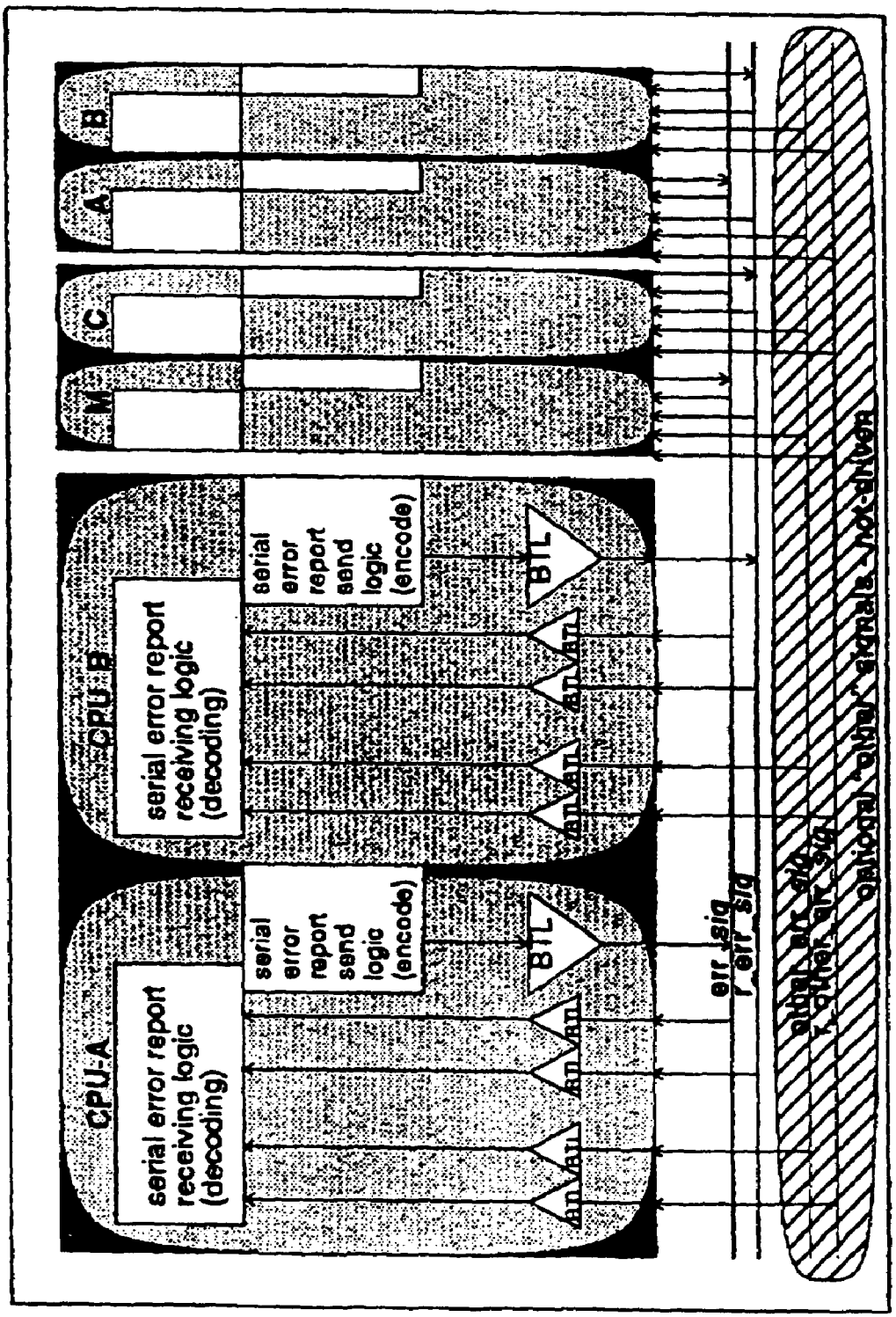
FIG. 6 is a diagram showing the routing of error reporting lines.

The error lines are routed on the backplane bus as shown in FIG. 6. The routing of both the err_int signals and the err_fatal signals is represented generically in terms of a generic error signal, err_sig. For a single agent board (such as a typical memory board), the err_sig and r_err_sig are driven identically. For a board with two independent agents err_sig is driven by the master M (agent-A) send logic while the checker C (agent-B) drives r_err_sig. Each error signal is logged independently to allow software to examine a complete view of the hardware failure as seen by all agents.

Figure 7:
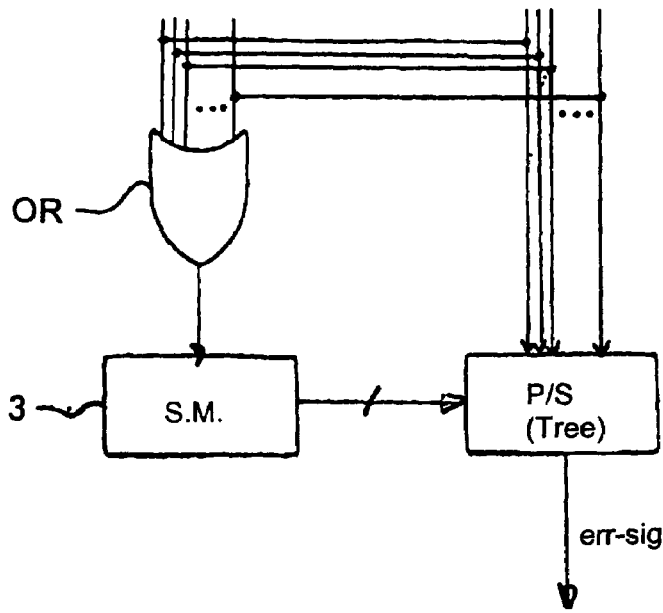
FIG. 7 is a block circuit diagram showing in greater detail a serial error report send logic of FIG. 6.
Figure 8:
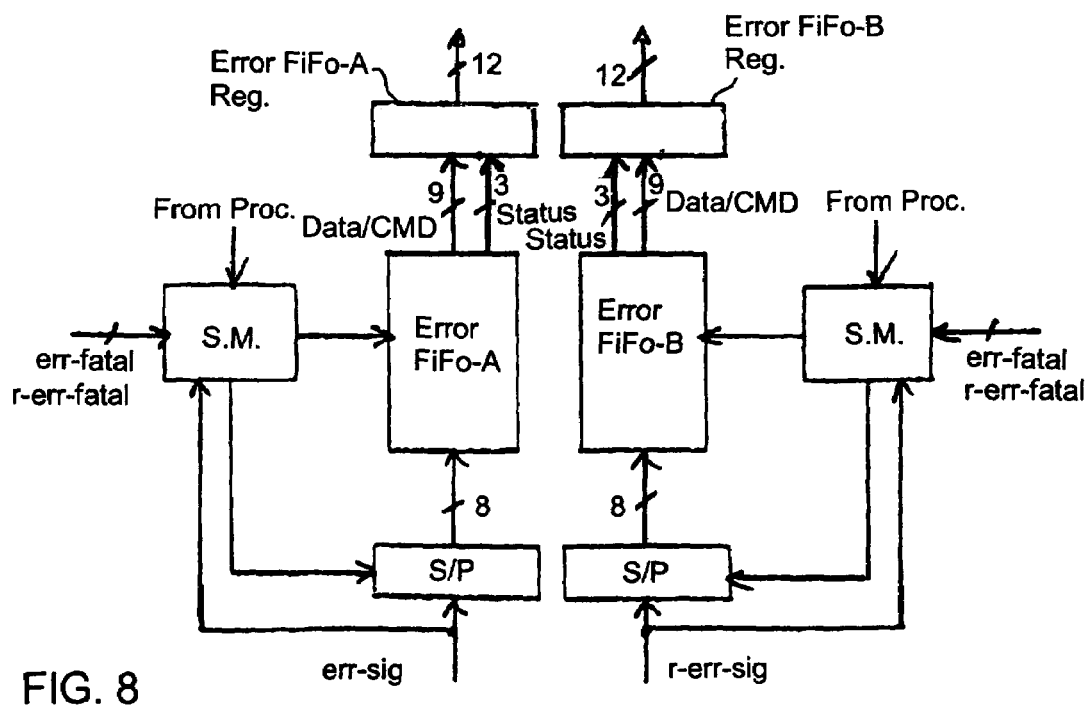
FIG. 8 is a block diagram showing in greater detail the serial error report receiving logic of FIG. 6;.

The serial error report sending logic and the serial error report receiving logic of FIG. 6 are shown in greater detail in FIG. 7 and FIG. 8, respectively.

Referring to FIG. 7, the sending logic, located on all R-Bus boards (DPU, memory, and IO) is simple and straightforward. A large OR gate combines all of the error signals from the board. A series of parallel-in serial-out shift registers also receive all of the error signals from the board and realizes a parallel-to-series conversion tree. The parallel-in serial-out shift registers hold the error bits before the error data is shifted out. A simple state machine 3 receives the output signal of the OR gate and controls the error report shifting.

Referring to FIG. 8, the receiving logic, located on DPU boards only, is also simple and straightforward. The error receiving logic is only on DPU boards so that the CPUs can access the error data locally without using the R-Bus. A set of two 8-bit serial-in, parallel-out shift registers is provided, one for each of the redundant error lines. A set of two 9-bit-FIFOs receive the raw error data from the serial-in parallel-out shift registers for software to log and analyze. The $9^{th}$ bit is set by recognition logic within the FIFO and is used to signal that the FIFO contains one of a predetermined number of command words. The command words signal the start and end of the error report. These command words allow software to synchronize the reading of the FIFOs. The FIFOs are read through respective error FIFO registers using a Pop FIFO command as described more fully hereinafter. Each FIFO also supplies to the error FIFO register three status bits, also described hereinafter.

Figure 9:
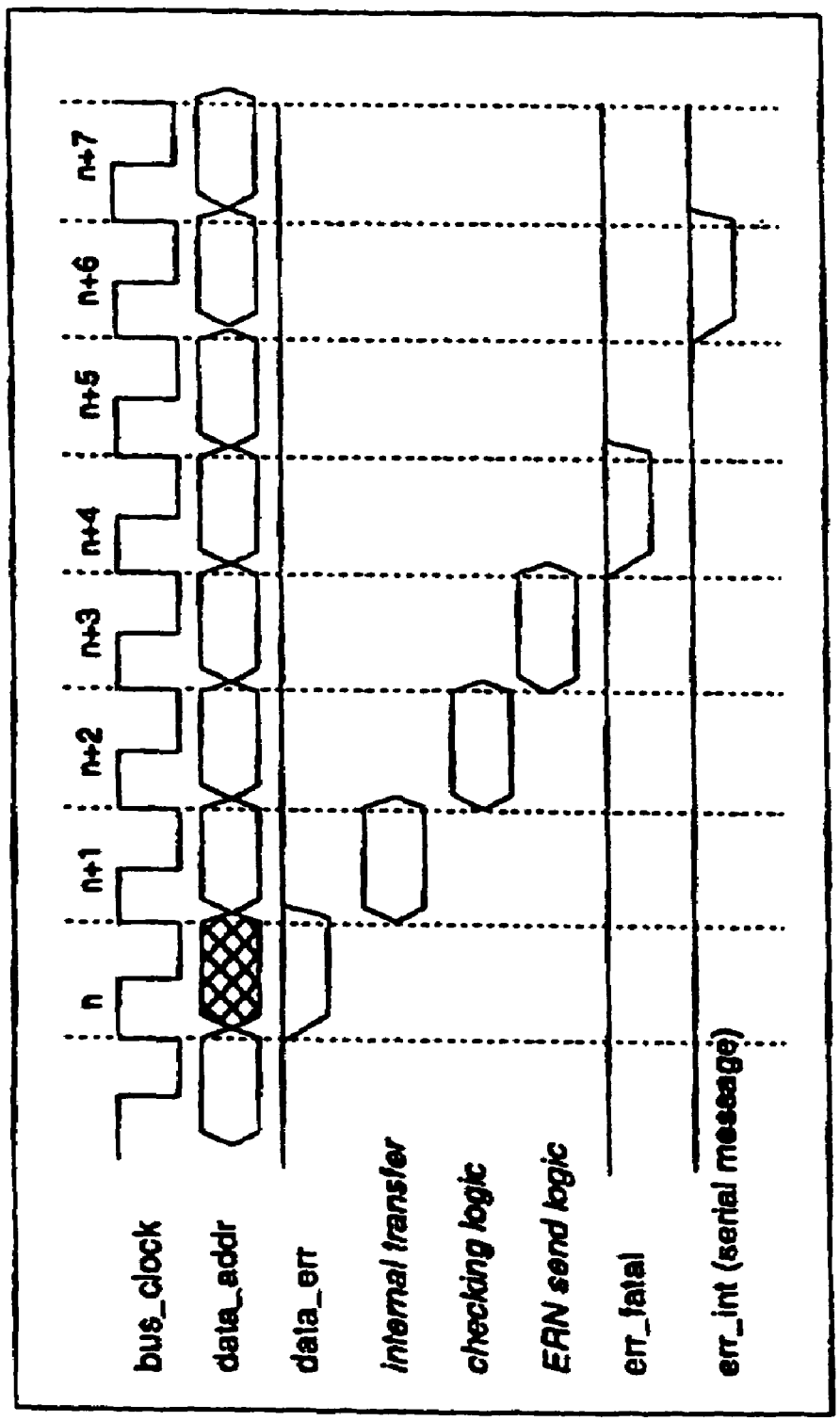
FIG. 9 is a timing diagram showing the relationship in certain instances of the occurrence of a fatal error in relation to corrupt data.

For R-Bus errors (parity, FRC, signal duplication) or for uncorrectable ECC errors, there is a direct relationship between the assertion of data_err, err_fatal and when corrupt data is sent down the backplane, as shown in FIG. 9. Most sources of err_fatal, however, are local to a board and are not synchronized with the backplane data transfer, so it is not possible to simply state which backplane transfers are related to the error. The only errors that trigger assertion of data_err are main memory uncorrectable ECC or cache parity errors. Data_err is used as a debug aid in detecting the exact cycle of corrupt data. The data_err signal is not replicated and transfers no additional information in a robust fault resilient system.

The serial error reporting network protocol enables a serial message to be sent on the err_int lines of the R-Bus, also called ern_n[1:0]. The use of these lines varies slightly by board type. For memory and IO boards, the message on ern_n[0] should be identical to that on ern_n[1]. For dual-processor (DPU) boards, CPU-A reports its error information on ern_n[0], and CPU-B reports its error information on ern_n[1]. The two reports will likely be similar but will not match exactly.

The purpose of the error reporting network (ERN) is to allow exact error status to be visible to software. A complete view of the error is needed for the following reasons: to determine which board has failed so it can be replaced; to allow software to maintain complete logs; as a debugging tool to localize the reason for the error quickly; to allow diagnostics and tests to determine the exact source of the problem.

The error report follows a simple time slice approach wherein each agent in the system sends up to a 256 bit serial message.

Each agent sends the report in slot order, with the board in slot 0 sending the first message followed by slot 1. The message has two parts, a short field that classifies the message severity and board type followed by a larger board definable message. The longer message contains complete error status for the board.

The error reporting protocol begins with a "start bit". In the simplest case, the start bit is the first assertion of err_int, r_err_int, err_fatal, or r_err_fatal. After the start bit then there is a brief time to get the board synchronized, then the serial message starts. After the detection of the start bit the err_int and r_err_int signals change function from error notification signals to error reporting signals. For the duration of the serial report the err_int and r_err_int signals are simply data transfer lines and are not asserted if more errors are detected during a serial message. Consequently, subsequent "non-fatal" errors are masked. (The error can be counted local to the board, however, thus greatly reducing the loss of subsequent error data caused by masking during the report).

The err_fatal and r_err_fatal signals are never used for error reporting and are always asserted after an error is detected, thereby preventing a "non-fatal" error from masking a "fatal" error. If a "non-fatal" error report is being sent and during the serial report err_fatal or r_err_fatal is asserted, then the "non-fatal" message is aborted. The error report is restarted at the beginning sending data about the new fatal error that was detected. A "fatal" error report is not aborted even by a later assertion of err_fatal or r_err_fatal. A "non-fatal" error report is started with an err_int or r_err_int asserted and both err_fatal and r_err_fatal are not asserted. A "fatal" error report is started by the assertion of err_fatal or r_err_fatal.

Figure 10:
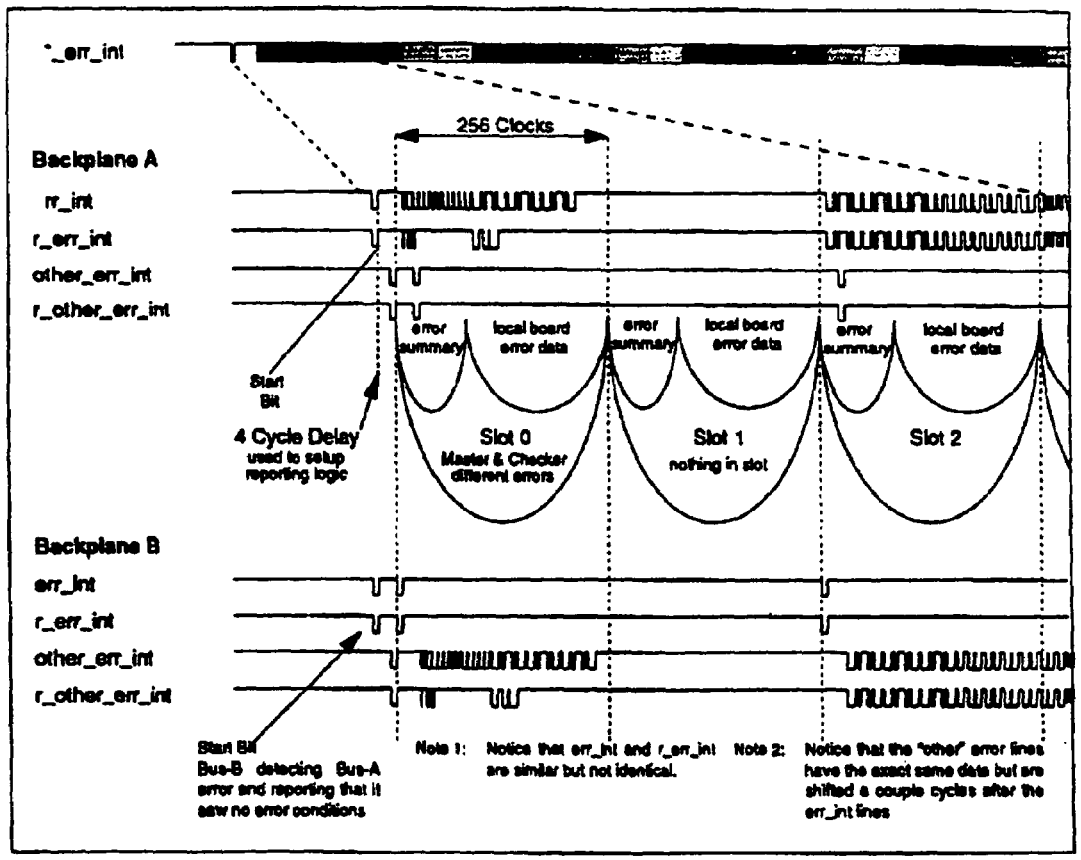
FIG. 10 is a diagram showing an error reporting serial message protocol.

FIG. 10 shows the relatively simple protocol of the serial message. After a start bit is detected, a few idle cycles occur to get the board state machines synchronized. The report itself is simply the concatenation of 256 bits of information generated by each board. After the start bit and waiting period, the board in slot 0 gets 256 cycles to send its error status. The next 256 cycles are for slot 1. If a slot is empty, then nothing is sent, and there are 256 cycles of zeroes. Each slot gets its turn until a specified number of time slices are done e.g., 32, or 16 if there are 16 or fewer boards in the system. There is no hardware decoding of the serial message—the data sent is simply logged for software to decode.

Figure 11:
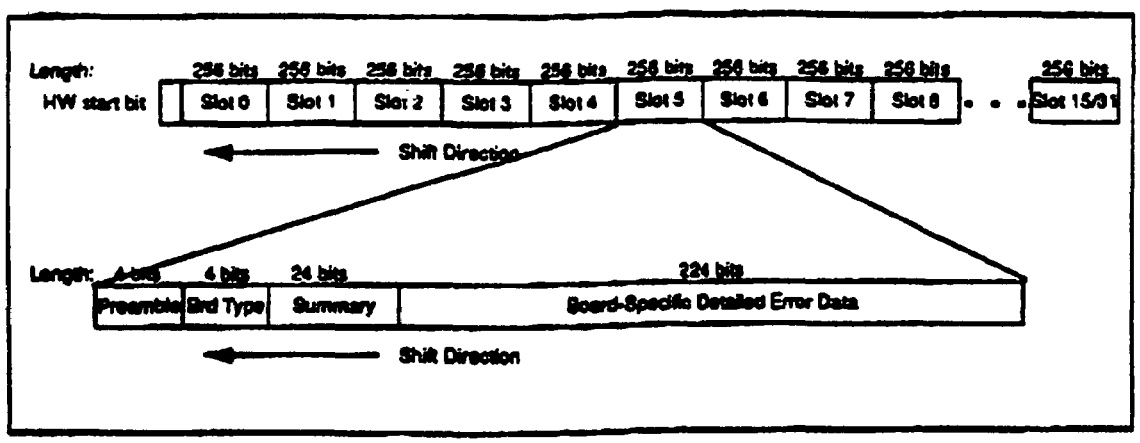
FIG. 11 is a diagram showing the error reporting serial message protocol.

As shown in greater detail in FIG. 11, within each board's 256 bit message, the first few bits is a fixed pattern, followed by a board type field, and then the summary error field. The remainder of the message is board dependent error status. The board normally reports data such as which byte or word was in error, critical error data (such as DRAM block address), and general board status. The total report is 8196 bus cycles long (based on 32 slots each sending 256 bits after a 4 cycle start-up time.)

In a preferred embodiment, the preamble is a fixed '0101' pattern. The '0' in the first bit position guarantees a dead cycle between adjacent messages precluding any possibility of a wired-OR glitch. The preamble also aids framing by providing an invariant pattern at the beginning of each slot report. The board type indicates what type of board (e.g., DPU, memory, or IO) is sending the message.

The summary field provides a condensed error report. Any error detected will set at least one bit in the summary field. The nature of the error can be determined by examining the summary field only; the rest of the message need be examined only if more detailed error status is required.

The first two bytes of the field contain error status information that is common to all board types. In a preferred embodiment, these bytes are encoded as shown in Table 8 below. The last byte (not shown in Table 8) contains board-specific error status information. The unused bits in all three bytes are filled with zeros.

TABLE 8

ERN Summary Field Encoding

| Bit[a] | Size | Meaning Used on: | Memory Board | DPU | IO Board |
|---|---|---|---|---|---|
| 8 | 1 | Set on any Fatal Error | X[b] | x[b] | X[b] |
| 9 | 1 | Other CPU asserted err_fatal_n[c] | | x | |
| 10 | 1 | Other CPU asserted err_int_n | | x | |
| 11 | 1 | R-Bus Signal Error | X[b] | X[b] | X[b] |
| 12 | 1 | R-Bus, No Acknowledge | X | X[b] | X |
| 13 | 1 | R-Bus Response Time-out | | X | X |
| 14 | 1 | Arbitration Class 0 Time-out | X | X | X |
| 15 | 1 | Arbitration Class 1 Time-out | | X | |
| 16 | 1 | Arbitration Class 2 Time-out | | X | X |
| 17 | 1 | R-Bus Protocol Error | X | X[b] | X |
| 18 | 1 | Board Disable Detected[e] | X | X | X |
| 19 | 1 | SW Triggered Error | X | X | X |
| 20:23 | 4 | No. of Errors since Last Report | X | x | X |

[a] Bit location starting with preamble bit 0.
[b] Additional error information in the detailed board-specific fields
[c] Notice level error.
[d] Always fatal level error.
[e] Fatal level error if enabled by S/W.

The error reporting logic state machines are initialized by hardware reset. The contents of the error reporting FIFOs are not altered on reset allowing software (or the watchdog timer) to reset the system to a known state before software reads the error reporting FIFO'S. On reset, the error reporting logic must not signal an error or participate in an error report until at least 8196 cycles with no error reporting lines being asserted. This restriction prevents a board coming out of reset (local reset or on-line insertion) from mistaking a data bit in the serial stream as a start bit. Since the longest report is 8196 cycles long after this delay the first assertion of an error reporting line is the start bit of a new error report.

FIFOs (implemented on the CPU boards, not on the memory boards) store the complete error message from each of the two err_int lines with no hardware filtering. Software too is then able to read the complete error report from local FIFOs without using the backplane bus. Since the data in the error FIFOs is straight from the error detection logic, software must check the data for errors and inconsistencies.

The FIFOs can overflow because there is a finite amount of hardware buffering. Software must therefore monitor the FIFO status registers to determine if there is a FIFO overflow. The FIFOs can also underflow, meaning get less data in a report than expected. Underflow occurs when a notice level error report is aborted by a fatal error report, causing the critical fatal error to be loaded at the expense of losing less critical data. Also, if the FIFO contains error notice data and a new fatal error is detected, the FIFO is flushed. Finally, a hardware failure may cause one of the four error reports to get corrupted, in which case underflow may occur.

Overflow and underflow can happen independently on each of the four logs. Software must count the number of bytes in the message to determine if an underflow occurred.

A number of registers are provided within each CPU to facilitate error detection and reporting. These include an error detection control register, an error FIFO-A Register, an Error FIFO-B Register, and an ERN message register. Operation of each of these registers will be briefly explained.

Figure 12:
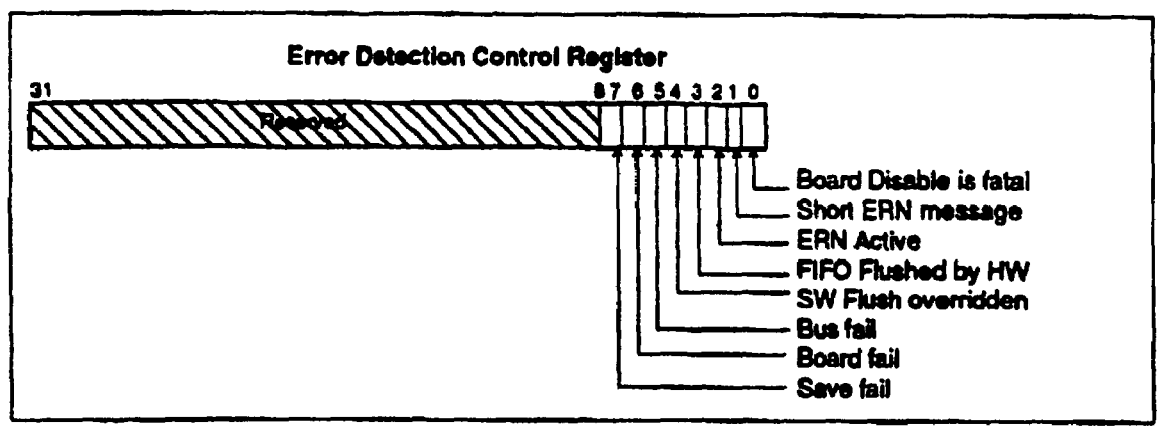
FIG. 12 is a diagram of a CPU error detection control register.

Referring to FIG. 12, showing the error detection control register, bit 0 (board-disable is fatal) is used to make a board being offline a fatal error. This bit is set when software is not expecting a board to be offline and is cleared as part of online repair. Bit 1 (short ERN) is used to abbreviate the error report in systems having fewer slots than the maximum allowable. Setting this bit "shorts" the number of slots in the serial error report from, in one embodiment, 32 slots to 16 slots. This shorting of the number of slots allows more errors to be stored in the fixed-size buffers. This bit must be set in all boards for the ERN to work correctly.

Bit 3 (ERN active) is a read only status bit that is set when the ERN is actively sending a serial message. Bit 4 (FIFO flushed by HW) is set if the FIFO has been flushed to make room for a fatal error message report. Flushing is only done if the FIFO does not have a have room for a new message and a fatal message is received. Bit 5 (SW flush overridden) is set if a FIFO flush command was ignored because an ERN message was in progress.

Bits 6, 7 and 8 relate to various failures. Bit 6 (board failed) is set when the present board has driven a fatal error report out (i.e. when the present board asserts (drives) either err_fatal_n line). Bit 7 (bus failed) is set when the present bus has seen a fatal error report (i.e. when hardware detects either err_fatal_n line to be asserted). Bit 8 (save fail) is set when the hardware detects a failed access. When this bit is set the "current outstanding access data" is saved in a control register to allow software to examine the status of the board. This feature is useful in some forms of software correction. This bit is set by hardware and can be cleared (or set) by software.

Figure 13:
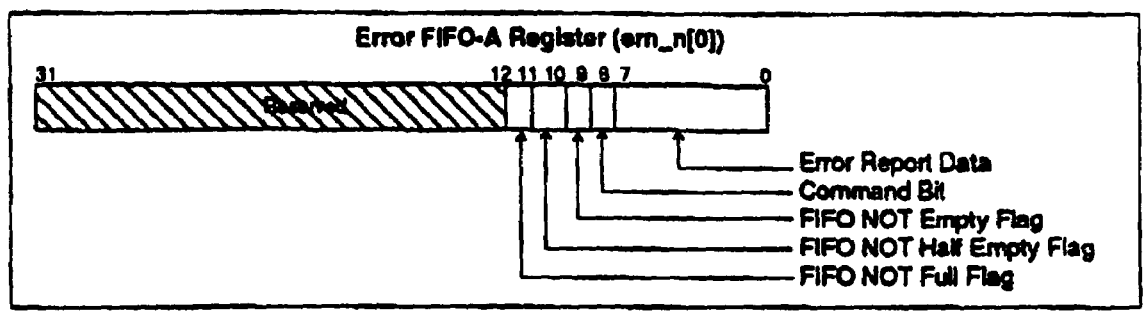
FIG. 13 is a diagram of a CPU error FIFO-A register.
Figure 14:
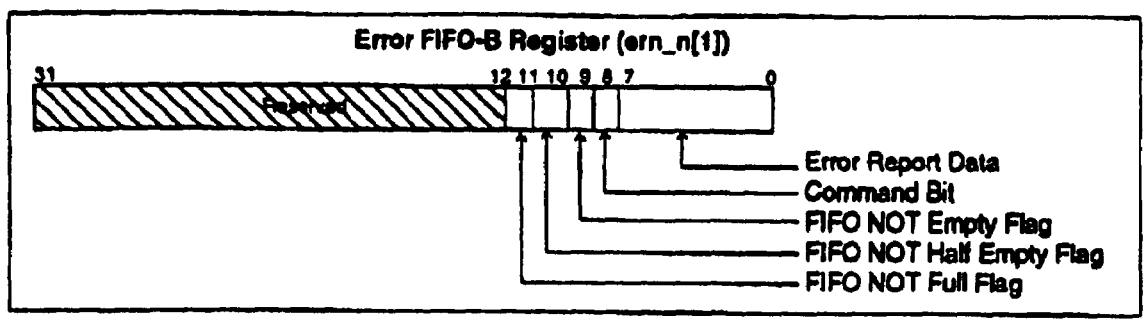
FIG. 14 is a diagram of a CPU error FIFO-B register.

Two serial error report log registers, error FIFO-A register and error FIFO-B register shown in FIG. 13 and FIG. 14, respectively, are provided for each CPU. These registers allow software to read the serial error report data unaltered as it was received from the err_int signals. Each of these registers is loaded only by a Pop FIFO command.

Following execution of a pop command, bits 0-7 contain error data, in particular eight bits of the serial message. A total of 1026 accesses are required to read the complete report from each register. Bit 8 is a command bit, a single bit set when the data field contains a marker (identifier, command). When this command bit is set, the data field has the following definitions:

FF—Start of fatal error report. The next byte in the FIFO is first data in an error report that was started by a fatal error.
FO—Start of notice error report. The next byte in the FIFO is first data in an error report that was started by a notice error.
AF—End of fatal error report. The previous byte in the FIFO is last data in an error report that was started by a fatal error.
FO—End of notice error report. The previous byte in the FIFO is last data in an error report that was started by a notice error.
CC—Reset detected. Previous error report may have been aborted Bits 9, 10 and 11 are FIFO flag bits, latch and inverted from the FIFO chip. These flag bits are the flags from the FIFO at the end of the last pop cycle.

A write to a particular register address triggers a flushing of the ERN FIFOs. Flushing resets the FIFOs to empty. Flushing is used in different cases. First, flushing is used to clear one FIFOs of one CPU if FIFOs of another CPU were used to read the error report. The clearing is done to clean out the already read data out of the FIFO so if a fatal error happens that forces a reset, all the FIFOs will have only the most current errors so that an error handler stored in a separate PROM for each CPU can read its local FIFO to get the error report. Also, flushing is used to clear the FIFOs after a power on reset. A normal reset does not affect the error FTFOs so that they can be read after reset.

The software flush register address supports broadcast writes to allow a complete bus to be reset.

Figure 15:
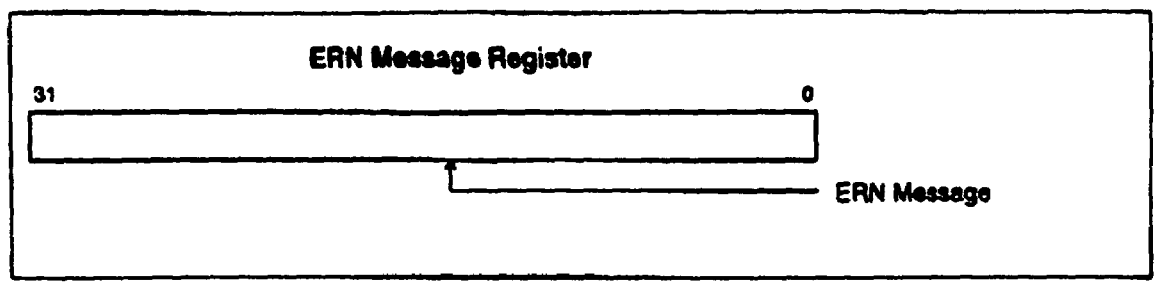
FIG. 15 is a diagram of an ERN (error reporting network) message register.

An ERN message register, shown in FIG. 15, contains data sent as part of the CPU specific data in the serial error report. This register is used to store software error codes and to test the error report logic.

As may be appreciated from the foregoing description, there has been described a high-reliability SMP backplane bus that is simpler than but offers comparable performance to existing buses. An error reporting network uses serial error registers, minimizing implementation cost and making the software interface to the serial registers much easier. Serial error information is transferred over a separate data path from the main parallel bus, decreasing the chance of the original error corrupting the error information. Each CPU is provided with a local copy of the entire body of error information, minimizing the impact of a possible CPU failure and allowing the CPUs to coordinate error recovery.

It will further be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

We claim:

1. In a computer system having a plurality of processor boards, each of the processor boards generating a plurality of error signals in response to different conditions on the processor boards, and a parallel transaction bus connected to each of the processor boards, an error reporting network comprising:
   a signal line, separate from the parallel transaction bus, and connected to each of the processor boards; and
   each of the processor boards containing:
      means for generating an error detection signal;
      control means responsive to the error detection signal for generating in sequence a plurality of control signals;
      means responsive to one of the control signals for collecting and storing the plurality of error signals;
      means responsive to one of the control signals for generating an error notification signal and for communicating the error notification signal to each of the processor boards over said signal line;
      means responsive to one of the control signals for communicating the plurality of error signals to each of the processor boards serially over said signal line;
      storage means;
      further control means responsive to the error notification signal for generating in sequence a plurality of further control signals;
      means responsive to one of the further control signals for converting to parallel form and storing in said storage means as error information the plurality of error signals communicated from each of the processor boards serially over said signal line; and
      means connected to said storage means for reading out the error information.

2. The network according to claim 1, wherein each of the processor boards is assigned a different slot number and said signal line is time division multiplexed between all of the processor boards, and said control means being responsive to the slot number for controlling said means for communicating so as to communicate the plurality of error signals serially over said signal line within a predetermined time slot in relation to other ones of the processor boards.

3. A method of communicating an error status between processor boards of a computer system, each of the processor boards generating a plurality of error signals in response to different conditions on the processor boards, the computer system further having a parallel transaction bus connected to each of the processor boards, and a signal line, separate from the parallel transaction bus, connected to each of the processor boards, each of the processor boards performing the steps of:

generating an error detection signal;
    generating in sequence a plurality of control signals;
    collecting and storing the plurality of error signals;
    generating an error notification signal and communicating the error notification signal to each of the processor boards over the signal line;
    communicating the plurality of error signals to each of the processor boards serially over the signal line;
    generating in sequence a plurality of further control signals in response to the error notification signal;
    converting to parallel form and storing as error information the plurality of error signals communicated from each of the processor boards serially over the signal line; and
    reading out the error information.

4. The method according to claim 3, which further comprises:

assigning each of the processor boards a different slot number and the signal line is time division multiplexed between all of the processor boards; and
    during the communicating step, communicating the plurality of error signals serially over the signal line within a predetermined time slot in relation to other ones of the processor boards.

5. A computer system, comprising:

a plurality of processor boards each generating a plurality of error signals in response to different conditions on said processor boards;
    a parallel transaction bus connected to each of said processor boards; and
    a signal line, separate from said parallel transaction bus, and connected to each of said processor boards;
    each of said processor boards containing:
        means for generating an error detection signal;
        control means responsive to the error detection signal for generating in sequence a plurality of control signals;
        means responsive to one of the control signals for collecting and storing the plurality of error signals;
        means responsive to one of the control signals for generating an error notification signal and for communicating the error notification signal to each of said processor boards over said signal line;
        means responsive to one of the control signals for communicating the plurality of error signals to each of said processor boards serially over said signal line;
        storage means;
        further control means responsive to the error notification signal for generating in sequence a plurality of further control signals;
        means responsive to one of the further control signals for converting to parallel form and storing in said storage means as error information the plurality of error signals communicated from each of said processor boards serially over said signal line; and
        means connected to said storage means for reading out the error information.

6. The computer system according to claim 5, wherein each of said processor boards is assigned a different slot number and said signal line is time division multiplexed between all of said processor boards, and said control means being responsive to the slot number for controlling said means for communicating so as to communicate the plurality of error signals serially over said signal line within a predetermined time slot in relation to other ones of said processor boards.

7. A computer system, comprising a plurality of processor boards generating a plurality of error signals in response to different conditions on said processor boards;
    a parallel transaction bus connected to each of said processor boards; and
    a signal line, separate from said parallel transaction bus, connected to each of said processor boards;
    each of said processor boards communicating an error status between said processor boards by being programmed to:
        generate an error detection signal;
        generate in sequence a plurality of control signals;
        collect and store the plurality of error signals;
        generate an error notification signal and communicate the error notification signal to each of said processor boards over said signal line;
        communicate the plurality of error signals to each of said processor boards serially over said signal line;
        generate in sequence a plurality of further control signals in response to the error notification signal;
        convert to parallel form and store as error information the plurality of error signals communicated from each of said processor boards serially over said signal line; and
        read out the error information.

8. The computer system according to claim 7, wherein said processor boards further programmed to:

assign each of said processor boards a different slot number and said signal line is time division multiplexed between all of said processor boards; and
    communicate the plurality of error signals serially over said signal line within a predetermined time slot in relation to other ones of said processor boards.

* * * * *